(12) United States Patent
McCullough et al.

(10) Patent No.: US 11,085,667 B2
(45) Date of Patent: Aug. 10, 2021

(54) ESTIMATION OF TEMPERATURE STATES FOR AN ELECTRIC WATER HEATER FROM INFERRED RESISTANCE MEASUREMENT

(71) Applicant: Battelle Memorial Institute, Columbus, OH (US)

(72) Inventors: Jason J McCullough, Columbus, OH (US); Michael A Jones, Columbus, OH (US); Eric L Rehberg, New Albany, OH (US)

(73) Assignee: BATTELLE MEMORIAL INSTITUTE, Columbus, OH (US)

( * ) Notice: Subject to any disclaimer, the term of this patent is extended or adjusted under 35 U.S.C. 154(b) by 109 days.

(21) Appl. No.: 16/422,352

(22) Filed: May 24, 2019

(65) Prior Publication Data

US 2019/0277537 A1    Sep. 12, 2019

Related U.S. Application Data

(63) Continuation-in-part of application No. 14/976,602, filed on Dec. 21, 2015, now Pat. No. 10,302,312.

(Continued)

(51) Int. Cl.
*F24H 9/20* (2006.01)
*G05B 17/02* (2006.01)

(52) U.S. Cl.
CPC .......... *F24H 9/2021* (2013.01); *G05B 17/02* (2013.01); *F24H 2250/02* (2013.01)

(58) Field of Classification Search
CPC .... F24H 9/2021; F24H 2250/02; G05B 17/02
See application file for complete search history.

(56) References Cited

U.S. PATENT DOCUMENTS 4,371,779 A    2/1983    Maynard
4,598,694 A    7/1986    Cromer
(Continued)

FOREIGN PATENT DOCUMENTS

CA    2 915 954 A1    6/2016

OTHER PUBLICATIONS

Fanney et al.; The Thermal Performance of Residential Electric Water Heaters Subjected to Various Off-Peak Schedules; Journal of Solar Energy Engineering; vol. 118; pp. 73-80; 1996.
(Continued)

*Primary Examiner* — Charles R Kasenge
(74) *Attorney, Agent, or Firm* — Fay Sharpe LLP

(57) ABSTRACT

A water heater that includes a cylindrical storage tank and at least one heating element, is modeled using a one-dimensional model that includes: a vertical stack of disks representing the water volume in the cylindrical storage tank, and a stack of annular segments surrounding the vertical stack of disks. Various temperature measurements are determined via resistance calculations of the at least one heating element. The stack of annular segments represents the cylindrical wall of the cylindrical storage tank. The one-dimensional model may be used by a condition-based maintenance system comprising an electronic data processing device configured to detect a failure mode present in the water heater based on an output of the water heating model component. Some illustrative failure modes include insulation disturbance, heating element failure, excessive sediment buildup, or a drip tube rupture.

25 Claims, 6 Drawing Sheets

Related U.S. Application Data

(60) Provisional application No. 62/095,593, filed on Dec. 22, 2014.

(56) References Cited

U.S. PATENT DOCUMENTS

| | | | | |
|---|---|---|---|---|
| 7,647,895 B2* | 1/2010 | Donelly | ............... | F23M 11/02 122/14.21 |
| 8,176,881 B2* | 5/2012 | Arensmeier | .......... | F24H 9/2035 122/14.22 |
| 9,645,014 B2* | 5/2017 | McMillan | ............... | G01K 3/10 |
| 2003/0091091 A1* | 5/2003 | Patterson | ........... | G05D 23/1951 374/141 |
| 2003/0093185 A1* | 5/2003 | Patterson | ........... | G05D 23/1917 700/299 |
| 2003/0093186 A1* | 5/2003 | Patterson | ........... | G05D 23/1951 700/299 |
| 2004/0069768 A1* | 4/2004 | Patterson | ........... | G05B 23/0283 219/492 |
| 2004/0158361 A1* | 8/2004 | Patterson | ........... | G05D 23/1951 700/299 |
| 2004/0161227 A1 | 8/2004 | Baxter | | |
| 2004/0225414 A1* | 11/2004 | Patterson | ............... | G01K 7/42 700/300 |
| 2005/0029248 A1* | 2/2005 | Patterson | ........... | G05D 23/1951 219/492 |
| 2006/0190141 A1* | 8/2006 | Patterson | ............... | G01K 7/42 700/299 |
| 2007/0191994 A1* | 8/2007 | Patterson | ........... | G05D 23/1951 700/299 |
| 2009/0101085 A1* | 4/2009 | Arensmeier | ............ | H04Q 9/00 122/14.22 |
| 2010/0004790 A1 | 1/2010 | Harbin, III | | |
| 2010/0030396 A1* | 2/2010 | Patterson | ........... | G05D 23/1951 700/300 |
| 2010/0179705 A1 | 7/2010 | Flohr | | |
| 2012/0227682 A1* | 9/2012 | Arensmeier | ............ | F23N 5/242 122/14.22 |
| 2014/0010260 A1* | 1/2014 | McMillan | ............... | G01K 3/10 374/102 |
| 2014/0037275 A1 | 2/2014 | Flohr | | |
| 2014/0062195 A1 | 3/2014 | Bruschi | | |
| 2014/0214227 A1* | 7/2014 | Thornton | .................. | H02J 3/00 700/295 |
| 2014/0228993 A1* | 8/2014 | Minnoy | ................ | G05B 15/02 700/103 |
| 2014/0248802 A1* | 9/2014 | Hieda | .................. | H01R 13/665 439/620.01 |
| 2014/0297048 A1* | 10/2014 | Buchheit | ............... | H04L 12/282 700/283 |
| 2014/0321839 A1 | 10/2014 | Armstrong | | |
| 2014/0333322 A1 | 11/2014 | Kabler | | |
| 2014/0333323 A1 | 11/2014 | Kabler | | |
| 2015/0127184 A1 | 5/2015 | Harbin, III | | |
| 2015/0277463 A1 | 10/2015 | Hazzard | | |

OTHER PUBLICATIONS

Vrettos et al.; Load Frequency Control by Aggregations of Thermally Stratified Electric Water Heaters; Innovative Smart Grid Technologies (ISGT Europe); 2012.

Koch, S.; Demand Response Methods for Ancillary Services and Renewable Energy Integration in Electric Power Systems; Dipl.-Ing., University of Stuttgart; Diss. No. 20470; 2012.

International Search Report for International Application No. PCT/US2020/033741 dated Aug. 31, 2020.

* cited by examiner

ESTIMATION OF TEMPERATURE STATES FOR AN ELECTRIC WATER HEATER FROM INFERRED RESISTANCE MEASUREMENT

This application is a continuation-in-part of U.S. patent application Ser. No. 14/976,602, filed Dec. 21, 2015 and titled "ESTIMATION OF UNKNOWN STATES FOR AN ELECTRIC WATER HEATER WITH THERMAL STRATIFICATION AND USE OF SAME IN DEMAND RESPONSE AND CONDITION-BASED MAINTENANCE", which claims the benefit of U.S. Provisional Application No. 62/095,593 filed Dec. 22, 2014 and titled "ESTIMATION OF UNKNOWN STATES FOR AN ELECTRIC WATER HEATER WITH THERMAL STRATIFICATION AND USE OF SAME IN DEMAND RESPONSE AND CONDITION-BASED MAINTENANCE". U.S. patent application Ser. No. 14/976,602 filed Dec. 21, 2015 and Provisional Application No. 62/095,593 filed Dec. 22, 2014 are incorporated herein by reference in their entirety.

BACKGROUND

The following relates to the water heater arts, water heater control arts, water heater maintenance arts, and related arts.

Water heaters are ubiquitous appliances in residential and commercial settings, used to provide hot water for washing, cleaning, laundry processing, industrial processes, and so forth. A typical electric water heater includes a water storage tank with one or more heating elements, typically at upper and lower positions. Cold water enters near the bottom of the water storage tank via a cold water feed pipe, and is heated by the heating elements. Heated water loses density, causing it to tend to rise upward, and this flow pattern is reinforced by entry of cold water near the bottom of the tank and extraction of hot water from the top of the tank. A gas water heater operates similarly, with the resistive electrical heating elements being replaced by a gas burner usually located near the bottom of the water storage tank. In either case, temperature control is typically achieved by a simple thermostat-based controller that applies heat when the water temperature in the storage tank falls below a deadband minimum and turns off the heater (gas or electric) when the water temperature rises above a deadband maximum. Within the deadband the heater setting remains unchanged, producing a temperature cycling within the deadband (possibly with some overshoot and/or undershoot) about a temperature set point located at about the middle of the deadband. This type of control advantageously leverages thermal hysteresis to reduce the on/off cycling of the heating element. Water temperature is usually set by adjusting the set point, with the deadband limits defined relative to the set point (e.g., ±2° C. above/below the thermostat set point).

Recognizing that water heaters in a building, city, or region represent a large distributed thermal energy storage reservoir, there has been interest in leveraging aggregations of water heaters as energy storage devices to provide demand response, in which the electrical load of the electric grid is matched with electrical generation. (By comparison, conventionally the power generation is adjusted to match load, for example by bringing ancillary power generators online/offline as needed to match load). By way of illustration, to perform load shedding the water heater operation can be curtailed during peak energy usage periods, with the hot water continuing (for a time) to be available from the hot water tank. As another illustration, in frequency control the load is adjusted at a higher frequency, typically on the order of seconds, in accord with an Automatic Generation Control (AGC) signal to maintain the grid frequency.

To perform demand response, especially at higher frequencies such as those required for AGC-based frequency control, the water heaters typically must be controlled remotely, for example by retrofitting the water heater with a remotely operable load controller (or, in the case of a new water heater, including such a load controller as an original manufacturer component). Also, the demand response must be balanced against the traditional function of water heaters: to provide hot water (which limits the time that the water heater can be kept off), as well as safety considerations such as not overloading the electrical circuits, or generating water that is scalding hot (which limits the time the water heater can be kept heating). To balance these considerations, it is useful to provide feedback to the aggregate controller, such as the water temperature in the storage tank, instantaneous water heater power consumption, or so forth.

Residential electric storage water heaters typically have two or more resistive heating elements submerged in the water. When two elements are used, generally one element is disposed at the top of the tank and the second element is disposed at the bottom of the tank. Currently, in order to procure temperature measurements of the water in the tank, external temperature sensors or probes are attached onto the tank at the top and the bottom, with output sent to a suitable control system. To maintain the integrity of the tank, specialized sensors must be used, increasing the complexity and the cost of residential electric storage water heaters. Thus, the parts and labor required to install external temperature probes are expensive, and create potential failure points of the tanks themselves.

Therefore, it would be advantageous to utilize the internal heating elements of the residential water tanks to measure the internal water temperature, ensuring the integrity of the tank, while reducing the complexity and cost of the residential hot water heater.

BRIEF SUMMARY

In some illustrative embodiments disclosed as illustrative examples herein, a water heater control system is disclosed for controlling a water heater that includes a vertically oriented cylindrical water storage tank having a cylindrical wall, and at least one heating element arranged to heat water in the water storage tank. The electric water heater control system comprises: a load controller comprising an electronic data processing device configured to operate the water heater including operating the at least one heating element based on temperature readings determined from a resistance of the at least one heating element to control water temperature of water in the water storage tank; and a water heater modeling component comprising an electronic data processing device configured to model the water heater using a one-dimensional model that includes: a vertical stack of disks representing the water volume in the cylindrical water storage tank, and a stack of annular segments surrounding the vertical stack of disks wherein the stack of annular segments represents the cylindrical wall of the cylindrical water storage tank. In some embodiments the one-dimensional model comprises coupled differential equations including: (1) for each disk of the vertical stack of disks representing the water volume in the cylindrical water storage tank, a differential equation expressing the time derivative of the temperature of the disk estimated by the one-dimensional model; and (2) for each annular segment of the stack of annular segments representing the cylindrical wall of the cylindrical water storage tank, a differential equation expressing the time derivative of the temperature of the annular segment estimated by the one-dimensional model.

In some illustrative embodiments disclosed as illustrative examples herein, a system includes a water heater, a load controller, an aggregation demand response dispatch engine, and a condition-based maintenance system. The water heater includes a water storage tank, and at least one heating element arranged to heat water in the water storage tank. The load controller comprises an electronic data processing device configured to operate the water heater including operating the at least one heating element based on temperature readings determined from a resistance of the at least one heating element to control water temperature of water in the water storage tank. The aggregation demand response dispatch engine comprises an electronic data processing device configured to send demand response commands to load controllers of an aggregation of loads including the load controller configured to operate the water heater. The load controller is further configured to operate the water heater in accord with demand response commands received from the aggregation demand response dispatch engine. A condition-based maintenance system comprises an electronic data processing device configured to detect a failure mode present in the water heater based on information including the temperature readings determined from the resistance of the at least one heating element and power input to the water heater.

In some illustrative embodiments disclosed as illustrative examples herein, a system comprises: an electrical load; a load controller comprising an electronic data processing device configured to operate the electrical load; an aggregation demand response dispatch engine comprising an electronic data processing device configured to send demand response commands to a loads aggregation including sending demand response commands to the load controller configured to operate the electrical load, wherein the load controller is further configured to operate the electrical load in accord with demand response commands received from the aggregation demand response dispatch engine; and a condition-based maintenance system comprising an electronic data processing device configured to detect a failure mode present in the electrical load based on information also input to the load controller.

In some embodiments, the condition-based maintenance system is configured to detect a failure mode present in the electrical load based on information also input to the load controller including (i) temperature determinations from the calculated resistance of the at least one heating element that corresponds to a temperature of a fluid volume whose temperature is controlled by the load controller operating the electrical load and (ii) electrical power input to the electrical load. In some embodiments the electrical load is one of an electric water heater and a heating, ventilation, and air conditioning (HVAC) system.

DETAILED DESCRIPTION

Figure 1:
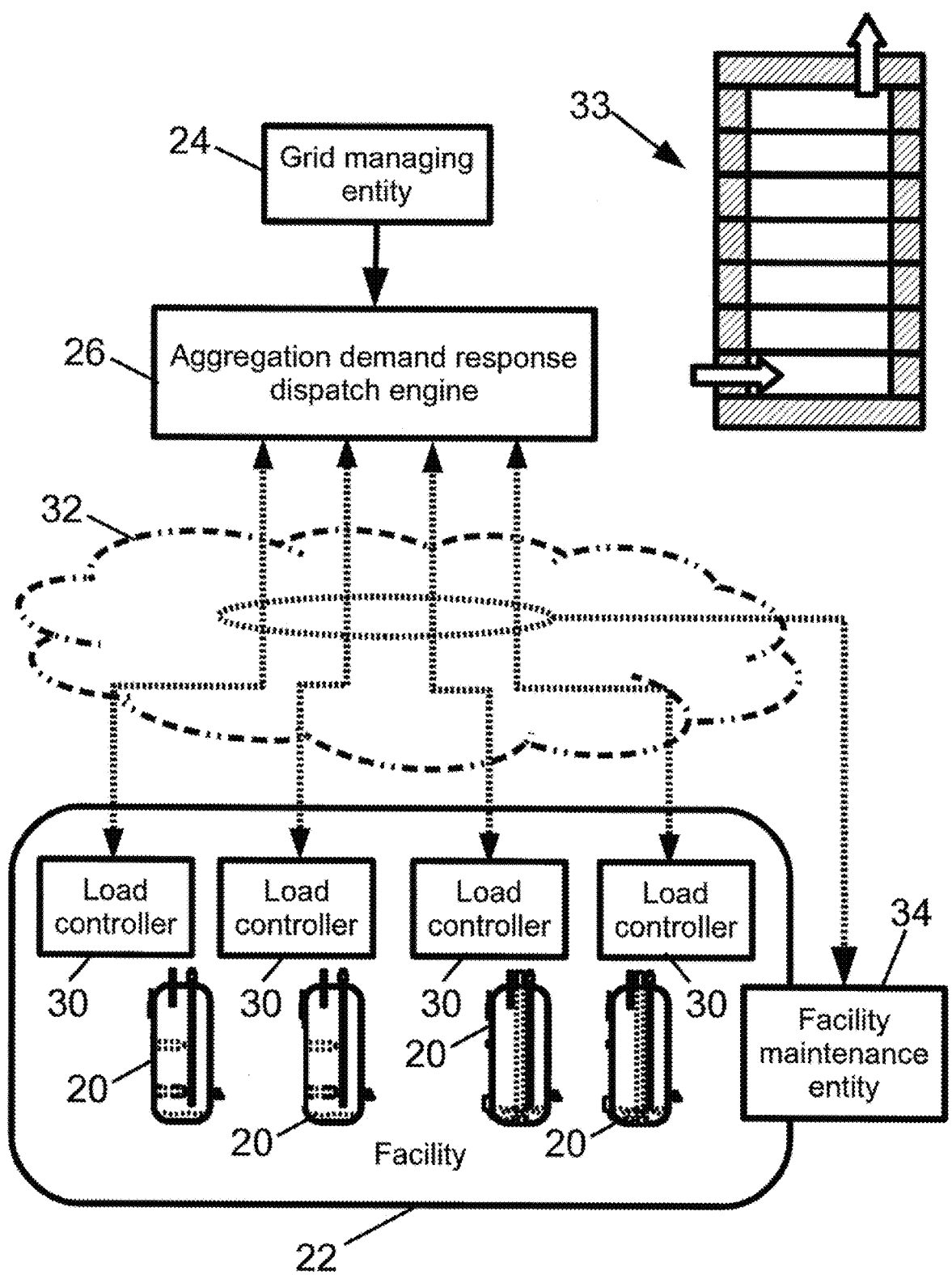
FIG. 1 diagrammatically shows a demand response system employing an aggregation of electrical loads comprising illustrative water heaters.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

A value modified by a term or terms, such as "about" and "substantially," may not be limited to the precise value specified. The modifier "about" should also be considered as disclosing the range defined by the absolute values of the two endpoints. For example, the expression "from about 2 to about 4" also discloses the range "from 2 to 4."

Disclosed herein are improved approaches for modeling a water heater for use in advanced operations such as demand response and condition-based maintenance. These approaches recognize that monitoring water heater operation by tracking temperature reading of the thermostat may not provide sufficient information for some advanced operations such as demand response. In order for electric water heaters to be effectively used as an energy storage device for demand response, the energy stored in the water heater should be tracked as a function of time. The internal temperature of water heater tank is typically taken as the energy storage state metric in order to infer available energy. Measuring the internal temperature of the water heater tank may be accomplished using an ancillary thermocouple or other temperature sensing device, or via analysis of the resistance of the heating elements of the water heater tank, as discussed in greater detail below. That is, the resistance of a heating element is dependent on temperature, and the temperature of a fluid may be determined by measuring the resistance of a heating element submerged in that fluid. This energy storage state metric assumes that the water in the tank is well-mixed, so that the water temperature is uniform throughout the tank. However, it is recognized herein that vertically oriented cylindrical water storage tanks, of the type commonly used in residential and commercial settings, may exhibit strong temperature stratification along the vertical direction, with the temperature near the bottom of the tank usually being lower than the temperature near the top of the tank. This vertical stratification is caused by the configuration of cold water feed and hot water draw lines: the cold water is supplied near the bottom of the tank, while the hot water is drawn from the top of the tank. Vertical temperature stratification also results from differences in density between the cold water and hold water—heating the water causes it to become less dense, leading the hotter water to tend to migrate upward through the tank. Vertical temperature stratification can also result from the use of discrete heating elements that do not impart heat into the tank volume uniformly.

The vertical temperature stratification impacts the dynamic energy behavior of the water heater. To model the temperature in the water tank, a complex three-dimensional (3D) model may be employed that incorporates computational fluid dynamics (CFD) methods to solve for thermal and mass transport dynamics. These methods are highly computationally expensive, and may be impractical for implementation in relatively simple electronics such as those desired to be incorporated into a water heater controller. Another difficulty is that such 3D modeling typically requires substantial information to be input to the model, which may be unavailable. Temperatures within the water storage tank are typically unavailable except at one or a two discrete points (e.g. one temperature reading per thermostat, with two thermostats provided in some conventional electric water heater designs). Similarly, water flow rates may be unavailable.

Attempts have been made to simplify the modeling by employing a one-dimensional water heater model. See Fanney et al., "The Thermal Performance of Residential Electric Water Heaters Subjected to Various Off-Peak Schedules", Journal of Solar Energy Engineering, vol. 118 pp. 73-80 (1996); Vettros et al., "Load Frequency Control by Aggregations of Thermally Stratified Electric Water Heaters", Innovated Smart Grid Technologies (ISGT Europe), 2012 $3^{rd}$ IEEE PES ISGT (IEEE 2012). However, these models do not account for three-dimensional effects, such as thermal losses at the shell of the tank 40.

Disclosed herein are one-dimensional (1D) lumped parameter models that operate on only two tank wall measurements with a known heating input to approximate the vertical temperature stratification of the water heater. The disclosed 1D models are suitably used to estimate internal water temperatures of the tank, as well as the (unmeasured) water draw flow rate and temperature. The 1D models disclosed herein leverage the substantial symmetry about the vertical axis of the cylindrical water storage tank of a typical water heater by modeling the cylindrical water tank as a stack of disks (sub-cylinders) along the vertical axis of the cylindrical water storage tank. Additionally, the disclosed 1D water heater models provide effective modeling of thermal behavior at the boundary of the tank 40 by including annular segments representing the tank wall, while still retaining the advantageous 1D formalism. This allows the use of wall temperature measurements to infer the internal unknown stratified dynamics.

The 1D model operating on limited inputs from the conventional water heater thermostat(s) provides more accurate information about the energy stored in the water heater tank at any given time, thus providing more effective demand response while ensuring the primary water heater function of providing hot water is also safely and effectively performed. The information provided by such a model can be leveraged to provide more accurate information about the operational status of key components of the water heater, thus providing information suitably used to perform condition-based maintenance of the water heater.

With reference to FIG. 1, a demand response system is disclosed, which leverages one or more (illustrative four) electric water heaters 20 of a facility 22 (residence, business, or so forth) to provide demand response in support of an electric grid managing entity 24. Because each water heater 20 individually provides a small amount of energy storage as compared with the electric grid, the water heaters 20 (possibly along with water heaters of other facilities, and/or along with other electrical devices capable of storing energy such as air conditions) are operated as an aggregation by a demand response dispatch engine 26 in order to coordinate operations of the water heaters (and optionally other loads of the aggregation) to provide demand response services. More particularly, the dispatch engine 26 is suitably embodied by a computer or other electronic data processing device communicating with load controllers 30 of the water heaters 20 or other electrical loads of the aggregation via a communication network 32 and programmed to receive demand response instructions from the grid managing entity 24 (for example, curtailment instruction in the case of a load shedding operation, or an AGC signal in the case of frequency regulation) and to send control commands to the load controllers 30 to cause the load controllers 30 to control their respective water heaters to implement the demand response instruction. The communication network 32 may, by way of illustrative example, include wired or wireless Internet links, wired or wireless local area network (LAN) links, Bluetooth links, various combinations thereof, or so forth.

As a more particular illustrative example, the demand response dispatch engine 26 may be connected with the Internet and send control commands via the Internet to an IP address associated with a facility controller (not shown) of the facility 22 which retransmits the control commands to network access points distributed through the facility 22 (possibly with some translation or other processing of the control commands at the facility controller) via a wired or wireless local area network, and the access points then transmit the control commands to the load controllers 30 via Bluetooth, wired connections, or another short-range communication link. These are merely illustrative examples. The load controllers 30 comprise electronic data processing devices and may be variously embodied, for example as microcontroller- or microprocessor-based controllers that replace the original manufacturer thermostat, or that augment operation of the original thermostat by operating a power relay connected with the power feed to the water heater, or intercepting and modifying the temperature input to the thermostat, or so forth. In some embodiments, the load controller 30 may be an original manufacturer component, e.g. a thermostat originally designed to accept remote control commands. Communication between the grid managing entity 24 and aggregation dispatch controller 26 may be via similar pathways (Internet, LAN, et cetera). Additionally or alternatively, demand response instructions may be conveyed from the grid managing entity 24 to the aggregation dispatch controller 26 manually, for example via telephone to a human data entry operator of a computer embodying the dispatch controller 26.

Besides providing a large aggregate energy storage capacity for demand response operations, another advantage of operating the water heaters 20 in an aggregation context is that this assists in ensuring that individual water heaters can deviate from the desired aggregate response in order to fulfill other, possibly contradictory, demands on the water heater, such as providing hot water or not overheating the water in the storage tank. Such deviations may be uncoordinated and/or coordinated. As an illustrative example of an uncoordinated deviation, a water heater may be commanded by the dispatch engine 26 to curtail energy usage—however, if the water in the water heater's storage tank falls below a deadband minimum of the thermostat, the load controller 30 controlling the water heater (or the original thermostat, depending on the precise control configuration) may activate the heating elements of the water heater in deviation from the energy usage curtailment command. If the deviant water heater is only one member of a relatively large aggregation of water heaters, then this uncoordinated deviation nonetheless will not significantly affect the demand response curtailment provided by the aggregation, and it allows the water heater to perform its primary duty of providing hot water. As an example of a coordinated deviation, during a load shedding operation the dispatch engine 26 may receive state information regarding the states of the water heaters 20 from their respective controllers 30, and based on this information the dispatch engine 26 may instruct a water heater with a low amount of thermal energy stored in its tank (i.e. the water is relatively cold) to operate in deviance from the curtailment command. This latter, coordinated approach requires more algorithmic complexity at the dispatch engine 26 in order to prioritize the curtailment amongst the water heaters of the aggregation, but has the advantage that the prioritization can better balance the demand response (e.g. curtailment) against individual load needs.

Each load controller 30 operates in part based on information generated by maintaining a dynamic one-dimensional (1D) model 33 of the water heater 20 under control of the load controller 30. In FIG. 1, the 1D water heater model 33 is diagrammatically shown in the upper right inset of FIG. 1—however, it is to be understood that a separate instance of the model is executed at each load controller 30 to model the water heater under control of that controller 30. (In an alternative embodiment, it is contemplated to execute the 1D model 33 for each water heater at the aggregation dispatch engine 26, based on inputs received from the load controller). The 1D water heater model 33 receives a limited number of inputs, and estimates the vertical temperature distribution through the volume of the water tank. For example, in one illustrative embodiment, the 1D model 33 receives as input the power reading for each heating element (of which there may be one or more heating elements for a given water heater), the temperature reading for the thermostat controlling each heating element, and an ambient temperature reading (or assumed room temperature value if the room containing the water heater has a well-controlled temperature). These inputs may be obtained by interfacing with the thermostat(s) of the water heater 20, by adding thermocouples or other temperature measurement devices to the wall or skin of the water heater holding tank, by employing a clamp-on ammeter or the like to measure electrical power input to the heating elements, by adding a room thermometer (or thermocouple, et cetera), or so forth. In embodiments discussed herein, these inputs may be determined in accordance with the methodology set forth in FIG. 4, as detailed below.

The output of the 1D model 33 for each controlled water heater 20 may be used in demand response applications to provide more accurate estimation of the thermal energy stored in the water tank as compared with a water temperature reading provided by the original thermostat. However, this is merely one possible application and others are contemplated. By way of illustrative example, another suitable application of the 1D model 33 is for estimating the operational condition of the modeled water heater 20. In this condition-based maintenance application, the more detailed knowledge regarding the operational state of the water heater 20 provided by the model 33 enables automated diagnosis of certain common failure modes such as partial insulation failure, heating element failure, excessive tank sediment build-up, or a rupture in the cold water feed drip tube that directs cold water to the bottom of the holding tank. Such a failure diagnosis may be communicated to the demand response dispatch engine 26 so that the dispatch engine can take the diagnosed failure into account in providing demand response services to the grid operator 24 (for example, by not using the apparently failed water heater to provide demand response). Additionally or alternatively, the failure diagnosis may be communicated to a facility maintenance entity 34 having responsibility for maintaining the water heaters 20 of the facility 22. The facility maintenance entity 34 may, for example, comprise a front-desk computer staffed by a building maintenance department and having a notifications component via which building maintenance personnel may be notified of the diagnosed failure, and/or the facility maintenance entity 34 may comprise a cellular telephone or networked tablet device carried by the building maintenance person and configured to push notifications to the user.

Figure 2:
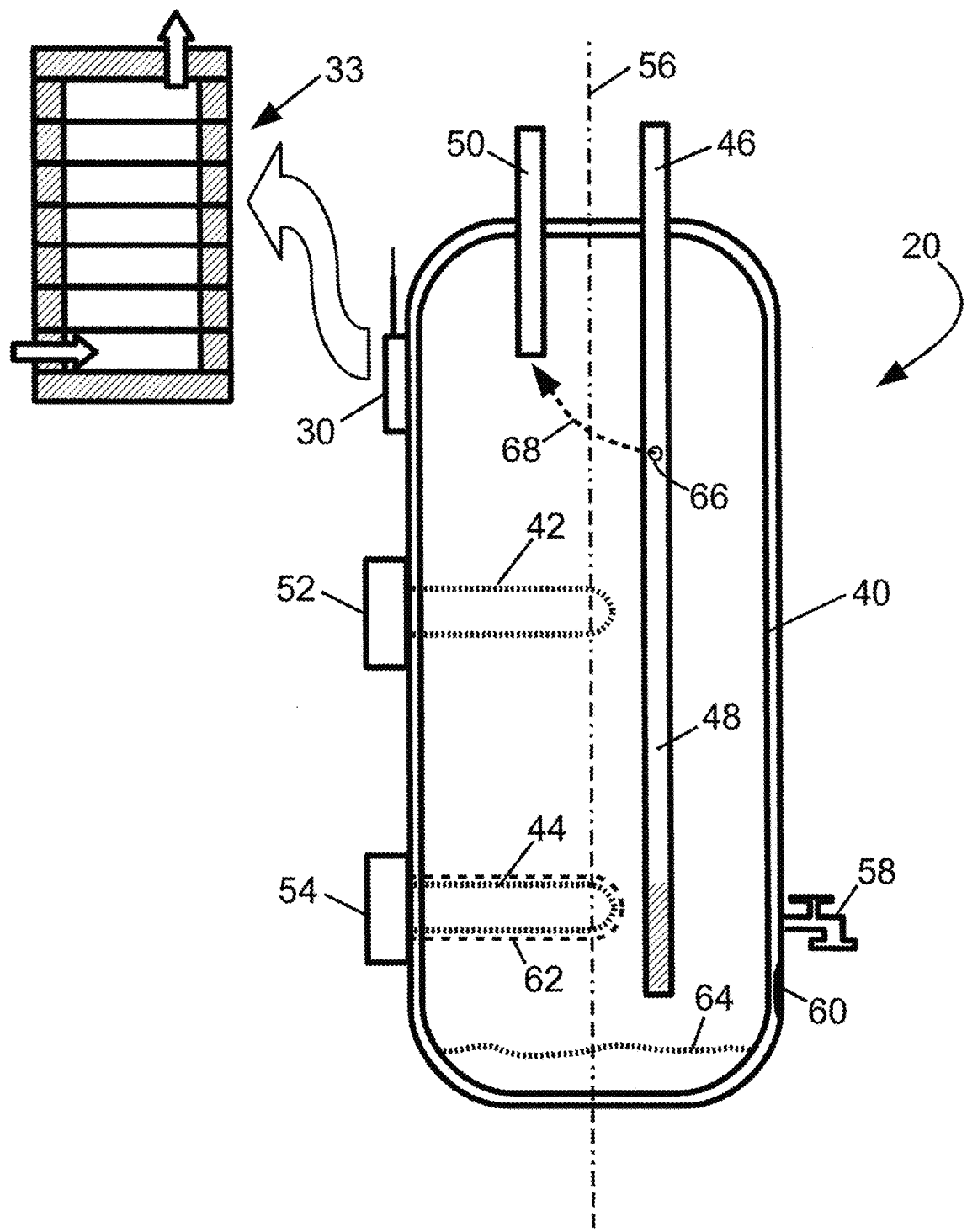
FIG. 2 diagrammatically shows a side partial sectional view of one of the water heaters of the system of FIG. 1.
Figure 5:
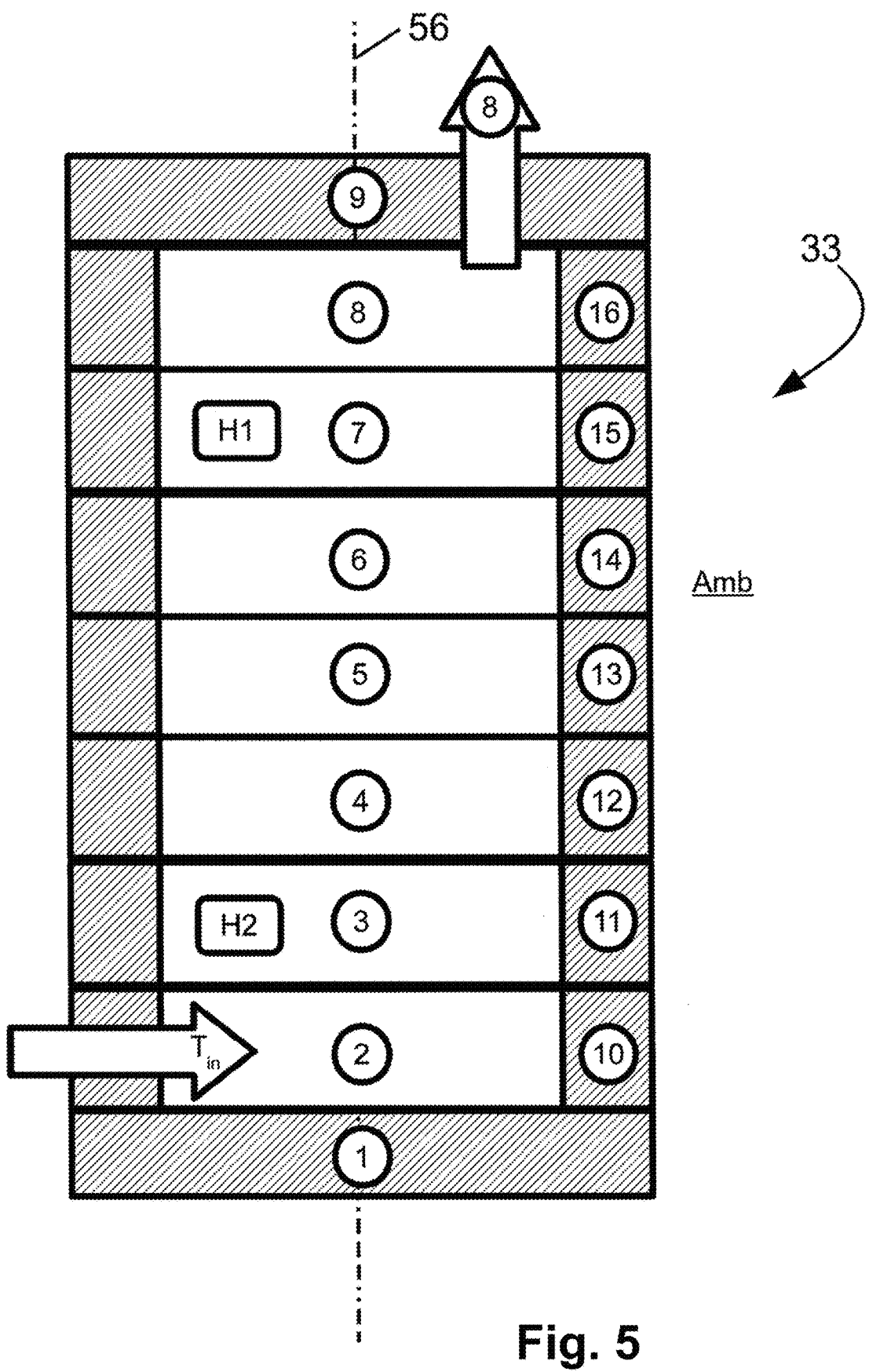
FIG. 5 diagrammatically shows a one-dimensional model of the water heater of FIGS. 2 and 3 including a vertical stack of disks representing the water volume in the cylindrical water storage tank, and a stack of annular segments surrounding the vertical stack of disks. The stack of annular segments represents the cylindrical wall of the cylindrical water storage tank.

With reference to FIGS. 2 and 5 an illustrative example of an electric water heater 20 is described (FIG. 2), along with a suitable embodiment of a 1D water heater model 33 (FIG. 5) suitably modeling the water heater of FIG. 2. The illustrative electric water heater 20 includes a water storage (or holding) tank 40 containing hot water (or water to be heated), an upper resistive heating element 42 and a lower resistive heating element 44 that can be electrically energized to heat water in the tank 40, a cold water inlet 46 including a drip tube 48 that extends downward to deliver cold water near the bottom of the tank 40, and a hot water draw line 50 positioned to draw hot water from at or near the top of the tank 40. The upper heating element 42 is controlled by an upper thermostat 52, and the lower heating element 44 is controlled by a lower thermostat 54. In a typical configuration, the upper thermostat 52 includes a set point adjustment knob (not shown) via which a user may adjust the temperature set point of the water heater 20, and the lower thermostat 54 is operatively linked with the upper thermostat 52.

The illustrative water heater 20 is of the vertically oriented cylindrical design, in which the storage tank 40 has the general shape of a cylinder defining a vertical tank (cylinder) axis 56. Although the tank 40 has the general shape of a vertically oriented cylinder, various deviations from the cylindrical shape may be present, such as illustrative rounded top and bottom portions, features such as the resistive heating elements 42, 44 that may break perfect cylindrical symmetry, or so forth. A drain valve 58 is also provided to enable water in the tank 40 to be drained out for maintenance, transport or decommissioning of the water heater 20, or for other purposes.

Also diagrammatically depicted in FIG. 2 are some failure modes that can be detected based on parameters estimated using the model 33. An illustrative region of corrosion 60 on the skin of the water heater tank 40, for example due to repeated exposure to water from the drain valve 52 or another source, may produce an insulation disturbance that increases thermal losses from the tank 40 and reduces water heater efficiency. The illustrative lower heating element 44 includes some fouling or build-up 62 that can reduce its ability to transfer heat into the water, thus lowering the heating efficiency. The bottom of the tank 40 also has an excessive sediment build-up 64 that reduces the actual water capacity of the tank 40 and may be indicative of a more serious problem such as corrosion of the inner lining of the tank 40. Still further, the drip tube 48 has developed a rupture 66 generating a flow path 68 via which cold water can pass directly to the hot water draw line 50 without being significantly heated by the heating elements 42, 44.

With continuing reference to FIG. 2, the illustrative load controller 30 that controls the illustrative water heater 20 is mounted on the skin or outside wall of the water storage tank 40. This is merely an illustrative example, and the load controller may in general be installed at various locations, for example wall-mounted and connected with the water heater by suitable cabling or so forth. The illustrative load controller 30 includes a microprocessor or microcontroller and associated components (e.g. electronic memory, analog-to-digital converters for reading thermocouples or other analog inputs, a USB port or other digital interface for receiving digital inputs or outputting digital outputs, a digital-to-analog converter for outputting an analog control signal, a WiFi interface, Ethernet interface, or other networking interface, various combinations, sub-sets, or so forth of the foregoing, et cetera) programmed or configured to execute a water heater control algorithm based on received remote inputs such as demand response control commands from the dispatch engine 26 (see FIG. 1). In performing such control operations, the load controller 30 executes the 1D water heater model 33 to model the current operational state based on inputs including: the power delivered to (or consumed by) the heating elements 42, 44; the temperature at the top and bottom of the tank 20 based upon the resistance of the elements 42, 44 (as described with respect to FIGS. 3 and 4 below); and an assumed or measured room (ambient) temperature. The water heater state information provided by the executing 1D water heater model 33 may also be used by a condition based maintenance algorithm executed by the load controller 30 to detect various failure modes, such as illustrative failure modes 60, 62, 64, 66, 68. In alternative embodiments, the 1D modeling algorithm and/or the failure mode detection algorithm may execute at the computer embodying the dispatch engine 26 or elsewhere.

It will be appreciated that due to manufacturing variability, as well as variability in the aging process, every heating element can be expected to have a unique temperature vs resistance curve that will vary over a timescale of months or years. To address this issue, the element resistance must be periodically calibrated against a known temperature value. For the purpose of water heater demand response, absolute temperature accuracy is not necessary. Instead, water temperature is most meaningful as a relative value.

In accordance with varying embodiments contemplated herein, the systems and methods utilize water heaters for a variety of functions in providing power grid services. When using the aforementioned water heaters to provide power grid services, there are two temperatures of interest as calibration values. The first value of interest is the water inlet temperature. Any time a substantial amount of water is drawn, the bottom heating element will be exposed to water that is at inlet temperature. Therefore, the minimum temperature observed within recent time (perhaps a month) can be taken to be the inlet temperature. The second value of interest is the thermostat set point temperature. In some embodiments contemplated herein, the set point temperature may be determined by repeatedly heating and then measuring water temperature until the mechanical thermostat opens and disconnects the heating element. Once these two temperatures have been determined, temperature can be measured as a percentage between inlet and thermostat temperature. As the water heater is used in normal operation, cold water is drawn into the bottom of the tank, and heated water is drawn out of the top. As briefly discussed above, most of the time, the bottom element will heat the incoming cold water to replenish the stored thermal energy of the tank, however if enough water is drawn out, the top element will run to first heat the water at the top of the tank before switching back over to the bottom element and completely heat the entire volume of water. Approximating where the top and bottom temperatures are allows the water heater to be abstracted as a thermal storage device (as described herein with respect to FIGS. 5-6) and is used operate the water heater in a manner that optimizes both comfort and grid services. The other complicating factor is that passing current through a heating element will cause self heating in the element. In order to mitigate this effect, either a low voltage must be applied to the element, or a short duration pulse must be used.

Figure 3:
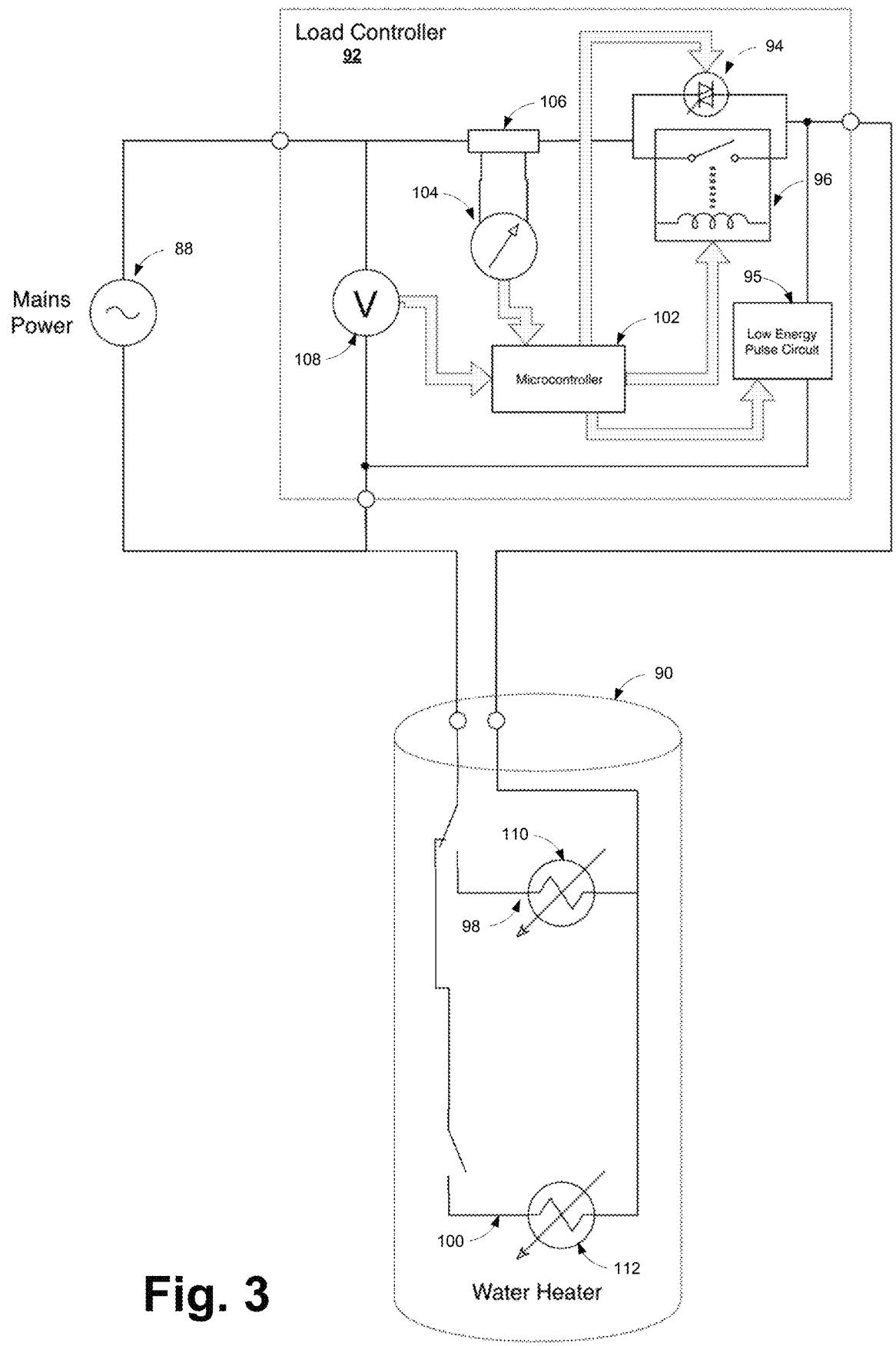
FIG. 3 diagrammatically illustrates circuitry and components of a water heater of the system of FIG. 1.

Turning now to FIG. 3, there is depicted a depicted a circuit diagram of the water heater 90 (shown in FIG. 1 as 20) and load controller 92 (shown in FIG. 1 as 30) in accordance with one embodiment of the subject application. It will be appreciated that the embodiment depicted in FIG. 3 illustrates hardware capable of facilitating the determination of the temperature(s) in the water heater 90. As depicted therein, the load controller 92 utilizes a solid state TRIAC 94 in parallel with a relay 96. It will be appreciated that the relay 96 is depicted in FIG. 5 as a mechanical relay, but may be implemented as other similarly functioning electrical switches, e.g., solid state or other relays, as are known in the art. According to varying embodiments of the subject system, the TRIAC 94 may function to soft switch the relay 96 for extension of the operational life of the relay 96. In this implementation, the TRIAC 94 may be used to "ping" the heating element 98 or 100 with a short pulse of voltage in order to measure the resistance of the element 98 or 100 without substantially changing the temperature of the element 98 or 100 itself.

In accordance with another embodiment, the load controller 92 utilizes a low energy pulse circuit 95 to "ping" the heating element 98 or 100 with the short pulse of voltage to measure the resistance thereof. The low energy pulse circuit 95 may comprise suitable electronic components to apply a relatively small voltage and accurately measure a low resistance, e.g. between 5 and 20 Ohms. In such an embodiment, the low energy pulse circuit 95 may be implemented in parallel with the TRIAC 94/relay 96, and operate in conjunction therewith to generate the pulse. Optionally, the low energy pulse circuit 95 may operate in place of the TRIAC 94/relay 96, depending upon operational considerations of the load controller 92, as will be appreciated by those skilled in the art. For example, the low energy pulse circuit 95 may operate when the TRIAC 94 and/or relay 96 are inoperative or ineffective to administer the desired voltage pulse.

As shown in FIG. 3, the controller 92 further includes a high accuracy voltage and current measurement circuit (shown as the voltage meter 108, ampere meter 104 and a sense resistor 106 having very low resistance and being calibrated to measure current) to measure the electrical power drawn by the heating element 98 or 100. It will be understood that by measuring the short voltage pulse delivered by the TRIAC 94 and then the resulting current draw from the heating element 98 or 100, using Ohm's law the resistance of the heating element 98 or 100 may be determined. It will be appreciated that the heating element resistance may then be correlated with the temperature of the heating element 98 or 100, which is at an equilibrium temperature with the surrounding water.

According to the embodiments described herein, the systems and methods are capable of determining which element 98 or 100 is running since the top element 98 and the bottom element 100 will typically have some slightly different resistance due to manufacturing variation, be rated for different power levels by the manufacturer, and the like. It will be appreciated that by identifying which element 98 or 100 is currently running will also provide an indication of how much thermal energy is stored in the tank, since cold water must have risen to a high enough level in the tank to activate the top element thermostat 110.

Figure 4:
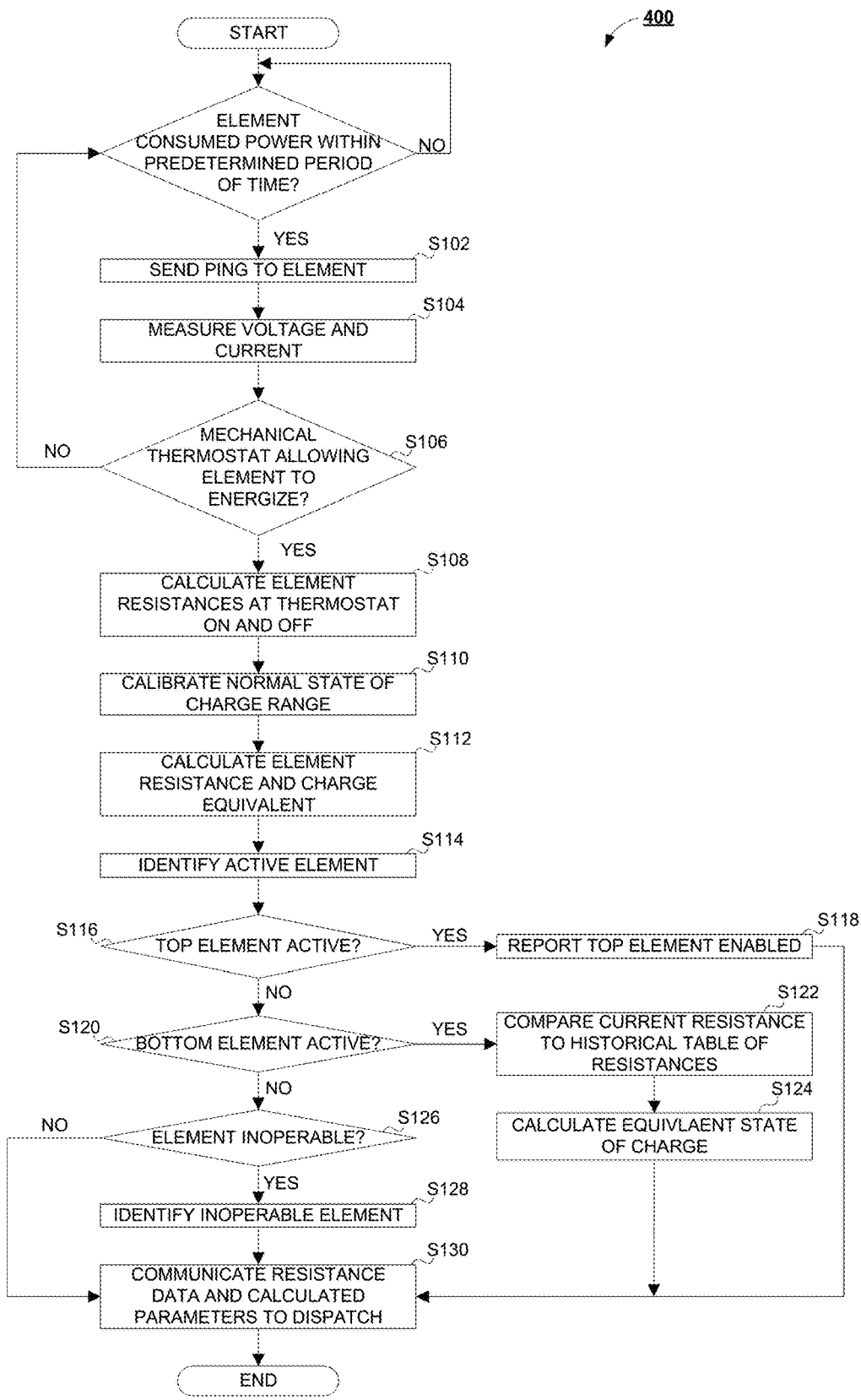
FIG. 4 diagrammatically shows a process flow for determining temperature of a cylindrical water storage tank using the resistive heating elements for use in the demand response system of FIG. 1.

Operations of the controller 92 and water heater 90 will be better understood in conjunction with the methodology shown in FIG. 4. According to various embodiments set forth herein, FIG. 4 illustrates one methodology for using the resistive heating elements 98 and 100 to determine the temperature of the water in the water heater tank 90. The method begins at S100, whereupon a determination is made by the load controller 92 or other suitable component associated with the water heater tank 90 whether an element 98 or 100 has consumed power within a predetermined period of time. It will be appreciated that S100 enables the system to wait for the element (98 and/or 100) and water to reach thermal equilibrium. Upon a positive determination at S100, the system method waits the aforementioned predetermined period of time and repeats S100. When it is determined at S100 that the element 98 or 100 has not consumed power within the predetermined period of time, operations proceed to S102. At S102, a ping is communicated to the element (98 or 100) via the TRIAC 94 and/or low energy pulse circuit 95 in accordance with operations of the microcontroller 102 operable in the load controller 102.

At S104, the voltage and current of the element 98 or 100 is measured, e.g., via voltmeter 108, ampere meter 104 (and leads 106), responsive the short pulse of the ping sent by the TRIAC 94 and/or low energy pulse circuit 95. A determination is then made at S106 whether the mechanical thermostat 110 or 112 of the corresponding heating element 98 or 100 is allowing the element 98 or 100 to energize. In the event that the mechanical thermostat 110 or 112 is not allowing energization of the heating element 98 or 100, operations return to S100, whereupon the system waits the predetermined period of time. Upon a positive determination at S106, the microcontroller 102 or other suitable component associated with the load controller 92 calculates element resistances at thermostat on and at thermostat off. That is, at points where mechanical thermostat 110 (or 112) "cuts in" and "cuts out", the resistance of the element 98 or 100 is calculated. Thereafter, at S110, a normal state of charge range for the water heater 90 is calculated using those resistances. The element resistance and charge equivalent is then calculated for each element 98 and 100 at S112.

At S114, a determination is made to identify which element, top element 98 or bottom element 110, is active. This identification, in accordance with one embodiment of the subject application, is determined by looking at the resistance ranges recorded as each element 98 and 100 tends to have a different temperature coefficient. According to varying embodiments contemplated herein, to identify which element 98 or 100 is running, the system and method may utilize time domain reflectometry or add a high frequency capacitor to one of the elements 98 or 100. In such an embodiment, time domain reflectometry may be accomplished by pinging the active circuit and determining the length of the wire, wherein the longer wire indicates the bottom element 100 is active and the shorter wire indicates the top element 98 is active. When a high frequency capacitor is utilized, the capacitance of the circuit may be measured to indicate which element 98 or 100 is connected (and therefore active).

At S116, a determination is made whether the top element 98 is running. Upon a positive determination at S116, operations proceed to S118, whereupon the top element is reported as enabled, i.e. the water tank 90 has a high priority of running. Operations then proceed to S130, as discussed in greater detail below. Returning to S116, upon a determination that the top element 98 is not running, a determination is then made at S120 whether the bottom element 100 is in operation. A positive determination at S120 prompts a comparison of the current resistance of the element 100 to a historical table of resistances at S122. In varying embodiments herein, the historical table of resistances may be stored in nonvolatile memory (not shown) of the microcontroller 102, stored by the aggregation demand response dispatch engine 26 and communicated to the load controller 92 via the network 32, or a combination thereof. In some contemplated embodiments, the table may be periodically flashed to nonvolatile memory of the microcontroller 102 during routine maintenance, at predetermined intervals, or the like, either directly onsite with the load controller 92 or remotely via the communications network 32. Thereafter, the equivalent state of charge of the water tank 90 is calculated by load controller 92 or other suitable component at S124. Operations then proceed to S130.

Following a negative determination at S120, a determination is made at S126 whether one of the elements 98 or 100 is burned out. That is, if both the top element 98 and the bottom element 100 are determined to not be in operation, then a determination is made whether one of the elements 98 or 100 is no longer operable. The burned out (non-operable) element 98 or 100 is then identified at S128. According to one embodiment, in the case of a burned out element, the temperature variations over time would need to be observed. For example, and without limitation, a single resistance pattern with a consistent saw tooth shape indicates a burned out bottom element 100 and only heating by the top element 98. If neither element 98 or 100 is determined to be burned out at S126, operations proceed to S130. At S130, the resistance data and calculated parameters are communicated to the aggregation demand response dispatch engine 26. In some instances, the aggregation demand response dispatch engine 26 may track the lowest resistances observed within some manufacturing tolerance to infer inlet temperature minimum over a suitable long time period, e.g., weeks or months. After determination of the respective temperature of the water tank 90, operations proceed as described below with respect to FIGS. 5-6 regarding controlling the water heater in accordance with the systems and methods set forth herein.

With reference to FIG. 5, an illustrative embodiment of the 1D water heater model 33 is described, which is suitable for modeling the illustrative water heater 20 shown in FIGS. 2 and 3. The 1D water heater model 33 utilizes two temperature measurements corresponding to the top and bottom of the heater 20 derived from the resistance of the heating elements 42, 44, the heating input to the heating elements 42, 44 (assumed to correspond to the electrical power input to the heating elements 42, 44), and an ambient temperature measurement (or assumed ambient temperature value). Estimates all the other internal and external temperatures are generated by the 1D model 33, along with estimates of the water draw mass flow rate and inlet water temperature with disturbance estimators. The 1D model 33 is a one-dimensional lumped model structure of the internal and external temperature dynamics of the water heater 20, in which the water tank 40 is divided into N finite lumps or disks. In the illustrative model 33 of FIG. 5, N=9 including disks representing the top and bottom of the tank.

More particularly, the illustrative 1D water heater model 33 of FIG. 5 includes a bottom disk 1 representing the bottom of the tank 40 and, running successively upward along the vertical cylinder axis 56, seven successive disks 2, 3, 4, 5, 6, 7, 8 each representing a successively higher disk of water in the stack of disks representing the volume of the water holding tank 40, topped at the highest elevation along the axis 56 by a top disk 9 representing the top of the tank 40. The walls of the cylindrical holding tank 40 between the top disk 1 and bottom disk 9 are also modeled, being represented by seven annular elements 10, 11, 12, 13, 14, 15, 16 at successively higher elevation and surrounding corresponding disks 2, 3, 4, 5, 6, 7, 8. Said another way, the lumped wall segment 10 is an annular segment surrounding the disk 2; the lumped wall segment 11 is an annular segment surrounding the disk 3; the lumped wall segment 12 is an annular segment surrounding the disk 4; the lumped wall segment 13 is an annular segment surrounding the disk 5; the lumped wall segment 14 is an annular segment surrounding the disk 6; the lumped wall segment 15 is an annular segment surrounding the disk 7; and the lumped wall segment 16 is an annular segment surrounding the disk 8. These annular segments enable accurate modeling of the impact of thermal losses at the walls of the water storage tank 40, while retaining the one-dimensional formalism so as to substantially reduce computational complexity as compared with three-dimensional modeling approaches.

Heat injected by the upper heating element 42 is represented by a heat input H1 into disk 7, and heat injected by the lower heating element 44 is represented by a heat input H2 into disk 3. The temperature reading M16 of the annular wall element 16, and the temperature reading M13 of the annular wall element 13 are determined in accordance with the methodology described in FIGS. 3 and 4 above. The cold water is assumed to be input (via the drip tube 48) into the lowest disk 2 and to have a temperature denoted as $T_{in}$. The hot water drawn is assumed to have the temperature of the uppermost disk 8. It will be appreciated that the number of disk/annulus divisions, and the locations of the heat inputs and temperature readings respective to those divisions, is suitably chosen to provide a desired spatial resolution in the vertical direction and to accurately model the actual positions of the heating elements and calculated temperature(s) in the water heater being modeled.

With continuing reference to FIGS. 2-3 and 5, the dynamic behavior of the water heater 20 as represented by the 1D model 33 of FIG. 5 can be represented mathematically by a one-dimensional model including: (1) for each disk of the vertical stack of disks representing the water volume in the cylindrical water storage tank, a differential equation expressing the time derivative of the temperature of the disk estimated by the one-dimensional model; and (2) for each annular segment of the stack of annular segments representing the cylindrical wall of the cylindrical water storage tank, a differential equation expressing the time derivative of the temperature of the annular segment estimated by the one-dimensional model. In an illustrative example, the 1D model 33 of FIG. 5 is suitably represented by the following set of Differential Equations (1)-(20):

$$\frac{d\hat{T}_1}{dt} = \frac{(\hat{T}_2 - \hat{T}_1)A}{m_1 c_{wall}\left(\frac{\Delta x_w}{2k_w} + \frac{\Delta x_s}{2k_s}\right)} + \frac{(\hat{T}_{10} - \hat{T}_1)A}{m_1 c_{wall}\left(\frac{\Delta y_w}{2k_w} + \frac{\Delta y_s}{2k_s}\right)} - \frac{(A_{wall,1} + A_b)U}{m_1 c_{wall}}(\hat{T}_1 - T_{amb}) + L_1\overline{T}_{10} + L_2\overline{T}_{13} \quad (1)$$

$$\frac{d\hat{T}_2}{dt} = \frac{k_w}{\Delta x_w m_2 c_w}(\hat{T}_3 - \hat{T}_2) + \frac{(\hat{T}_1 - \hat{T}_2)A}{m_2 c_w\left(\frac{\Delta x_w}{2k_w} + \frac{\Delta x_s}{2k_s}\right)} + \frac{\hat{m}}{m_2}(\hat{T}_{in} - \hat{T}_2) - \frac{(\hat{T}_2 - \hat{T}_{10})A}{m_2 c_w\left(\frac{\Delta x_w}{2k_w} + \frac{\Delta x_s}{2k_s}\right)} + L_3\overline{T}_{10} + L_4\overline{T}_{13} \quad (2)$$

$$\frac{d\hat{T}_3}{dt} = \frac{k_w}{\Delta x_w m_3 c_w}(\hat{T}_2 - 2\hat{T}_3 + \hat{T}_4) + \frac{\hat{m}}{m}(\hat{T}_2 - \hat{T}_3) - \frac{(\hat{T}_3 - \hat{T}_{11})A}{\frac{\Delta x_w}{2k_w} + \frac{\Delta x_s}{2k_s}} + \frac{\eta P}{m_4 c_w}u_1 + L_5\overline{T}_{10} + L_6\overline{T}_{13} \quad (3)$$

$$\frac{d\hat{T}_4}{dt} = \frac{k_w}{\Delta x_w m_4 c_w}(\hat{T}_3 - 2\hat{T}_4 + \hat{T}_5) + \frac{\hat{m}}{m_4}(\hat{T}_3 - \hat{T}_4) - \frac{(\hat{T}_4 - \hat{T}_{12})A}{\frac{\Delta x_w}{2k_w} + \frac{\Delta x_s}{2k_s}} + \frac{\dot{m}_{cf}}{m_4}(\hat{T}_3 - 2\hat{T}_4 + \hat{T}_5) + L_7\overline{T}_{10} + L_8\overline{T}_{13} \quad (4)$$

$$\frac{dT_5}{dt} = \frac{k_w}{\Delta x_w m_5 c_w}(\hat{T}_4 - 2\hat{T}_5 + \hat{T}_6) + \frac{\hat{m}}{m_5}(\hat{T}_4 - \hat{T}_5) - \frac{(\hat{T}_5 - \hat{T}_{13})A}{\frac{\Delta x_w}{2k_w} + \frac{\Delta x_s}{2k_s}} + \frac{\dot{m}_{cf}}{m_5}(\hat{T}_4 - 2\hat{T}_5 + \hat{T}_6) + L_9\overline{T}_{10} + L_{10}\overline{T}_{13} \quad (5)$$

$$\frac{d\hat{T}_6}{dt} = \frac{k_w}{\Delta x_w m_6 c_w}(T_5 - 2T_6 + T_7) + \frac{\hat{m}}{m_6}(\hat{T}_5 - \hat{T}_6) - \frac{(\hat{T}_6 - \hat{T}_{14})A}{\frac{\Delta x_w}{2k_w} + \frac{\Delta x_s}{2k_s}} + \frac{\eta P}{m_6 c_w}u_2 + \frac{\dot{m}_{cf}}{m_6}(\hat{T}_5 - 2\hat{T}_6 + \hat{T}_7) + L_{11}\overline{T}_{10} + L_{12}\overline{T}_{13} \quad (6)$$

$$\frac{d\hat{T}_7}{dt} = \frac{k_w}{\Delta x_w m_7 c_w}(\hat{T}_6 - 2\hat{T}_7 + \hat{T}_8) + \frac{\hat{m}}{m_7}(\hat{T}_6 - \hat{T}_7) - \frac{(\hat{T}_7 - \hat{T}_{15})A}{\frac{\Delta x_w}{2k_w} + \frac{\Delta x_s}{2k_s}} + \frac{\dot{m}_{cf}}{m_7}(\hat{T}_6 - 2\hat{T}_7 + \hat{T}_8) + L_{13}\overline{T}_{10} + L_{14}\overline{T}_{13} \quad (7)$$

$$\frac{d\hat{T}_8}{dt} = \frac{k_w}{\Delta x_w m_8 c_w}(\hat{T}_7 - 2\hat{T}_8 + \hat{T}_9) + \frac{\dot{m}}{m_8}(\hat{T}_7 - \hat{T}_8) - \frac{(\hat{T}_8 - \hat{T}_{16})A}{\frac{\Delta x_w}{2k_w} + \frac{\Delta x_s}{2k_s}} + \frac{\dot{m}_{cf}}{m_8}(\hat{T}_7 - \hat{T}_8) + L_{15}\overline{T}_{10} + L_{16}\overline{T}_{13}$$ (8)

$$\frac{d\hat{T}_9}{dt} = \frac{(\hat{T}_9 - \hat{T}_8)A}{m_9 c_{wall}\left(\frac{\Delta x_w}{2k_w} + \frac{\Delta x_s}{2k_s}\right)} + \frac{(\hat{T}_{16} - \hat{T}_9)A}{m_9 c_{wall}\left(\frac{\Delta y_w}{2k_w} + \frac{\Delta y_s}{2k_s}\right)} - \frac{(A_{wall,9} + A_t)U}{m_9 c_{wall}}(\hat{T}_9 - \hat{T}_{amb}) + L_{17}\overline{T}_{10} + L_{18}\overline{T}_{13}$$ (9)

$$\frac{d\hat{T}_{10}}{dt} = \frac{(\hat{T}_2 - \hat{T}_{10})A}{m_{10} c_{wall}\left(\frac{\Delta x_w}{2k_w} + \frac{\Delta x_s}{2k_s}\right)} + \frac{(\hat{T}_1 - 2\hat{T}_{10} + T_{11})A}{m_{10} c_{wall}\left(\frac{\Delta y_s}{2k_s} + \frac{\Delta y_s}{2k_s}\right)} - \frac{A_{wall,1}U}{m_{10} c_{wall}}(\hat{T}_{10} - T_{amb}) + L_{19}\overline{T}_{10} + L_{20}\overline{T}_{13}$$ (10)

$$\frac{d\hat{T}_{11}}{dt} = \frac{(\hat{T}_3 - \hat{T}_{11})A}{m_{11} c_{wall}\left(\frac{\Delta x_w}{2k_w} + \frac{\Delta x_s}{2k_s}\right)} + \frac{(\hat{T}_{10} - 2\hat{T}_{11} + T_{12})A}{m_{11} c_{wall}\left(\frac{\Delta y_s}{2k_s} + \frac{\Delta y_s}{2k_s}\right)} - \frac{A_{wall,1}U}{m_{11} c_{wall}}(\hat{T}_{11} - T_{amb}) + L_{21}\overline{T}_{10} + L_{22}\overline{T}_{13}$$ (11)

$$\frac{d\hat{T}_{12}}{dt} = \frac{(\hat{T}_4 - \hat{T}_{12})A}{m_{12} c_{wall}\left(\frac{\Delta x_w}{2k_w} + \frac{\Delta x_s}{2k_s}\right)} + \frac{(\hat{T}_{11} - 2\hat{T}_{12} + T_{13})A}{m_{12} c_{wall}\left(\frac{\Delta y_s}{2k_s} + \frac{\Delta y_s}{2k_s}\right)} - \frac{A_{wall,1}U}{m_{12} c_{wall}}(\hat{T}_{12} - T_{amb}) + L_{23}\overline{T}_{10} + L_{24}\overline{T}_{13}$$ (12)

$$\frac{d\hat{T}_{13}}{dt} = \frac{(\hat{T}_5 - \hat{T}_{13})A}{m_{13} c_{wall}\left(\frac{\Delta x_w}{2k_w} + \frac{\Delta x_s}{2k_s}\right)} + \frac{(\hat{T}_{12} - 2\hat{T}_{13} + T_{14})A}{m_{13} c_{wall}\left(\frac{\Delta y_s}{2k_s} + \frac{\Delta y_s}{2k_s}\right)} - \frac{A_{wall,1}U}{m_{13} c_{wall}}(\hat{T}_{13} - T_{amb}) + L_{23}\overline{T}_{10} + L_{24}\overline{T}_{13}$$ (13)

$$\frac{d\hat{T}_{14}}{dt} = \frac{(\hat{T}_6 - \hat{T}_{14})A}{m_{14} c_{wall}\left(\frac{\Delta x_w}{2k_w} + \frac{\Delta x_s}{2k_s}\right)} + \frac{(\hat{T}_{13} - 2\hat{T}_{14} + T_{15})A}{m_{14} c_{wall}\left(\frac{\Delta y_s}{2k_s} + \frac{\Delta y_s}{2k_s}\right)} - \frac{A_{wall,1}U}{m_{14} c_{wall}}(\hat{T}_{14} - T_{amb}) + L_{23}\overline{T}_{10} + L_{24}\overline{T}_{13}$$ (14)

$$\frac{d\hat{T}_{15}}{dt} = \frac{(\hat{T}_7 - \hat{T}_{15})A}{m_{15} c_{wall}\left(\frac{\Delta x_w}{2k_w} + \frac{\Delta x_s}{2k_s}\right)} + \frac{(\hat{T}_{14} - 2\hat{T}_{15} + T_{16})A}{m_{15} c_{wall}\left(\frac{\Delta y_s}{2k_s} + \frac{\Delta y_s}{2k_s}\right)} - \frac{A_{wall,1}U}{m_{15} c_{wall}}(\hat{T}_{15} - T_{amb}) + L_{23}\overline{T}_{10} + L_{24}\overline{T}_{13}$$ (15)

$$\frac{d\hat{T}_{16}}{dt} = \frac{(\hat{T}_8 - \hat{T}_{16})A}{m_{16} c_{wall}\left(\frac{\Delta x_w}{2k_w} + \frac{\Delta x_s}{2k_s}\right)} + \frac{(\hat{T}_9 - \hat{T}_{16})A}{m_{16} c_{wall}\left(\frac{\Delta y_w}{2k_w} + \frac{\Delta y_s}{2k_s}\right)} - \frac{A_{wall,1}U}{m_{16} c_{wall}}(\hat{T}_{16} - T_{amb}) + L_{23}\overline{T}_{10} + L_{24}\overline{T}_{13}$$ (16)

$$\frac{d\hat{\dot{m}}}{dt} = \hat{m}_2 + L_{23}\overline{T}_{10} + L_{24}\overline{T}_{13}$$ (17)

$$\frac{d\hat{m}_2}{dt} = -\alpha_1 \hat{m}_1 - \alpha_2 \hat{m}_2 + L_{23}\overline{T}_{10} + L_{24}\overline{T}_{13}$$ (18)

$$\frac{d\hat{T}_{in}}{dt} = \hat{T}_f + L_{23}\overline{T}_{10} + L_{24}\overline{T}_{13}$$ (19)

$$\frac{d\hat{T}_f}{dt} = -\alpha_3 \hat{T}_{in} - \alpha_4 \hat{T}_f + L_{25}\overline{T}_{10} + L_{26}\overline{T}_{13}$$ (20)

In these Differential Equations, the following symbols are used:

A is the lateral area of each of the disks 2, 3, 4, 5, 6, 7, 8;
$T_{amb}$ is the ambient temperature;
$\hat{T}_{in}$ is the estimated temperature for cold water delivered into disk 2;
$\hat{T}_1$ is the estimated temperature for the bottom of the tank (disk 1);
$\hat{T}_2$ is the estimated temperature for water in the disk 2;
$\hat{T}_3$ is the estimated temperature for water in the disk 3;
$\hat{T}_4$ is the estimated temperature for water in the disk 4;
$\hat{T}_5$ is the estimated temperature for water in the disk 5;
$\hat{T}_6$ is the estimated temperature for water in the disk 6;
$\hat{T}_7$ is the estimated temperature for water in the disk 7;
$\hat{T}_8$ is the estimated temperature for water in the disk 8;
$\hat{T}_8$ is also the estimated temperature for drawn hot water;
$\hat{T}_9$ is the estimated temperature for the top of the tank (disk 9);
$\hat{T}_{10}$ is the estimated temperature for the annular wall segment 10;
$\hat{T}_{11}$ is the estimated temperature for the annular wall segment 11;
$\hat{T}_{12}$ is the estimated temperature for the annular wall segment 12;
$\hat{T}_{13}$ is the estimated temperature for the annular wall segment 13;
$\hat{T}_{14}$ is the estimated temperature for the annular wall segment 14;
$\hat{T}_{15}$ is the estimated temperature for the annular wall segment 15;
$\hat{T}_{16}$ is the estimated temperature for the annular wall segment 16;
$\dot{m}$ is the estimated water draw flow rate (mass per unit time);
U is the heat transfer coefficient between the shell and the environment;
$\overline{T}$ is the error between measured and estimated temperatures;
L is the observer design gain, which is a design constant that multiples the error between the measurement and the estimation of the two shell temperatures;
$\Delta x$ is the thickness of each disk in the horizontal direction;
$\Delta y$ is the thickness of each disk in the vertical direction;
$k_w$ is the thermal conductivity of water;
$k_s$ is the thermal conductivity of steel (or other material) forming the tank;
ρ denotes density;
c denotes specific heat;
η denotes the efficiency or effectiveness of the heater, and ranges from 0:1;
P is the heater power.

The unknown input estimators take on an arbitrary form of a second order system for purpose of explanation as seen in Equations (17)-(20). The assumed temperature measurements are $T_{10}$ and $T_{13}$ (so that measured v. estimated error quantities $\overline{T}_{10}$ and $\overline{T}_{13}$ are defined).

Figure 6:
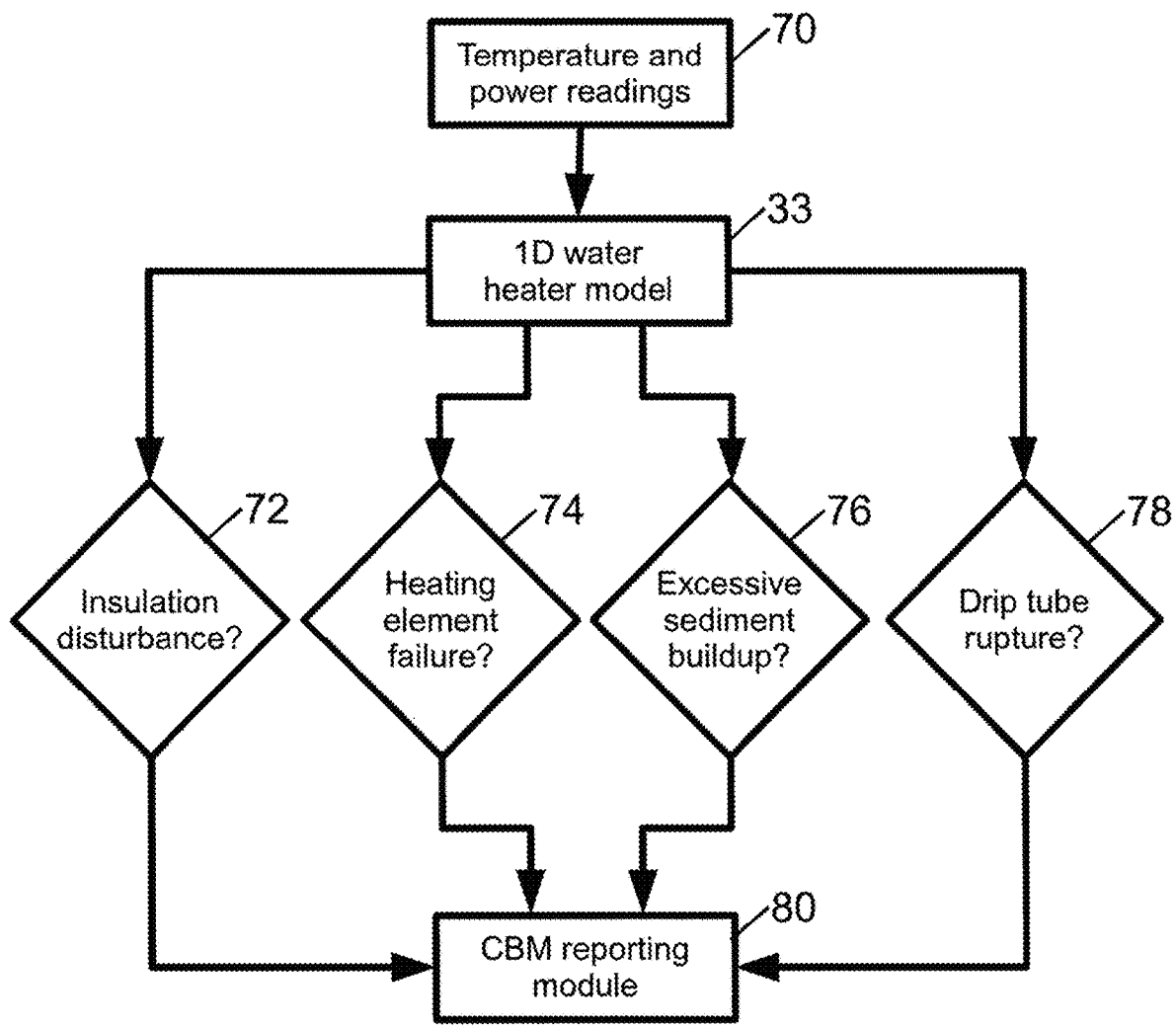
FIG. 6 diagrammatically shows a process flow performed by a condition-based maintenance (CBM) component of the demand response system of FIG. 1.

The skilled artisan can readily modify the illustrative water heater 20 and/or model 33 of FIGS. 5 and 6 to model water heaters with different numbers of disks (thus providing different vertical resolution), different number or placement of temperature heaters, and so forth. Similarly, it is contemplated to omit or add additional physical characteristics to the model.

The illustrative model 33 can be used for various purposes. In the illustrative demand response example of FIG. 1, the model 33 can be used to more accurately assess the energy stored in the tank at any given time, so that the dispatch engine 26 can more effectively leverage the aggregate stored energy for demand response while ensuring that individual water heaters 20 can perform their intended function of providing hot water within certain constraints (temperature, capacity, et cetera). The energy stored in the tank 40 can be computed as the sum of the energy stored in each disk of the stacked disks representing the water in the cylindrical tank 40. The energy stored in each disk can be computed as Energy stored=$C_p$*dT*m where $C_p$ is the specific heat capacity of water, dT is the temperature difference between the water in the disk and the surroundings, and m is mass of water.

In another illustrative application, the model 33 is used to provide condition based maintenance. The use of water heater temperatures for identification of maintenance issues affecting the water heater advantageously benefits the end-user (who typically owns and utilizes the water heater) by detecting potential problems early, while they can be repaired in a cost-effective manner, or while they can be resolved by replacing the water heater before a catastrophic failure such as a large-scale water leak occurs. Condition based maintenance as disclosed herein also enables the water heater to be kept in efficient operating condition, thus lowering energy costs for the end user. These incentives advantageously encourage the end-user to participate in the aggregation managed by the dispatch engine 26. Optionally, the aggregation may charge a fee for providing this maintenance monitoring, thus generating an additional revenue stream for the demand response system operators.

By way of the illustrative example of FIGS. 2-4, the state of a water heater 20 comprises two (or more) temperature measurements of the water temperature (as illustrated in FIGS. 3-4), along with the electrical power being consumed as suitably measured by a clamp-on ammeter or the like. The state measurements are combined with the model 33 of the water heater 20 to obtain estimates for parameters describing the water heater 20, such as the effective insulation thermal resistance, first hour delivery, effective volume, heating element power transfer rate, and so forth. These parameters can be used for providing demand response as already described, and additionally can be used to infer the (possibly incipient) presence of possible failure modes so as to provide condition based maintenance (CBM) capability. Condition based maintenance provides a mechanism for maintaining the water heater based upon its actual condition prior to failure, rather than performing maintenance at specified service intervals or simply waiting for the device to fail outright. Implementing CBM has several positive impacts on the end user and the maintenance provider. For the end user, the costs of maintaining a device can be reduced by servicing only at the onset of an issue rather than at regular intervals. Maintenance schedules are generated for typically usage patterns, but if the usage pattern for a particular water heater differs from typical, maintenance could be performed too frequently increasing costs, or too infrequently leading to device failure and replacement and repair costs. The end user also benefits from a reduced number of service interruptions because operational issues are detected prior to the failure of a device, and the water heater can be serviced without the disruption of a failure. An additional financial benefit for the user is that the water heater is kept operating closer to its peak efficiency, reducing energy costs. Because water heaters operate transparently in the absence of a failure (that is, the user is typically satisfied as long as hot water of the desired temperature is being delivered), the end-user may be unaware that the water heater is operating under reduced performance and efficiency, because the user experience has not changed and any increase in energy cost is gradual and can go unnoticed. The CBM systems disclosed herein notify the user of the onset of a failure mode, such as (with brief reference back to FIG. 2) an insulation disturbance 60, fouling or build-up 62 on a heating element 44, excessive sediment build-up 64, or a rupture 66 in the drip tube 48 generating a cold water bypass flow path 68. By identifying the failure mode with some particularity, the end user is alerted of the problem early, and can take corrective action.

As a further benefit, maintenance providers (for example, in the context of a water heater service contract) can increase the level of service provided to their customers by using CBM while also reducing their costs. The level of service to customers can be enhanced by reducing the number of unneeded, schedule based service calls, while also reducing the likelihood of a device being unexpectedly removed from service. The maintenance costs can be reduced by scheduling work to be performed during normal business hours, rather than off-hours requiring differential or overtime pay. This can be done because failures can be anticipated based on the output of the CBM system, thus the providers can operate proactively instead of reactively. When technicians are dispatched to a site, a better understanding the service needed is already available prior to their departure, as the CBM system output provides the service technician with identification of the likely failure mechanism before the service technician examines the water heater. This knowledge reduces the risk of a technician being dispatched without the proper parts or tools.

With returning reference to FIG. 1, CBM system may be implemented as software or firmware executed in conjunction with the model 33 by the microprocessor or microcontroller of the load controller 30, and/or may be implemented as software or firmware executed at the dispatch engine 26 which communicates with the load controller 30. Implementing the CBM at the load controller 30 reduces bandwidth costs and spreads computational complexity across the load controllers 30. The CBM for a water heater 20 leverages the temporal recording of at least two temperatures calculated from a corresponding number of heating elements and the power consumed by the water heater. From these temperature calculations, i.e., measurements, the state of the water heater is estimated, for example using the model 33, where state is a measure of the energy stored within the device, and power being consumed.

The water heater typically has a minimum and maximum usable energy state. The minimum energy is when the temperature(s) are at the deadband minimum and the maximum energy is when the temperature(s) are at the deadband maximum. The power consumption state may be discrete power levels, based upon the size and number of heaters operating. Using these state values, parameter identification can be performed, fitting measurements to the model 33 of the water heater 20. The parameters to be estimated may, for example, include the effective capacity (the volume of water the tank contains), the thermal conductivity from the tank to ambient, the effective mixing rate, first hour delivery capacity, and the heating element size. By monitoring these parameters over time and using other error detection methodologies, changes in system operation signifying the onset of a failure mechanism (broadly defined herein as encompassing the spectrum from catastrophic failure, e.g. a major water leak or complete cessation of water heating, to failures that produce less deleterious effects such as reduced operational efficiency).

With reference to FIG. 6, an illustrative CBM system is described, which may be implemented at the load controller 30 or the dispatch engine 26. In an operation 70, the temperature readings and input power are measured (corresponding to $T_{10}$, $T_{13}$, and $u_1$ and $u_2$ in the model 33 of Equations (1)-(20)), and these inputs are applied to the model 33 to generate the estimated water temperatures $\hat{T}$ and estimated water flows $\hat{m}$. These information then serve as the inputs to various illustrative water heater failure mode detectors 72, 74, 76, 78 as described next. It should be noted that a detected failure mode does not necessarily require that the failure has actually occurred—rather, a failure mode detector may "anticipate" a failure by detecting incipient degradation of a type having a significant potential to lead to a failure of the detected failure mode. A failure mode may also be detected early, that is, at a point where performance has been compromised by the failure mode to some degree but has not yet reached a point where remedial action (e.g. repair or replacement) is appropriate.

An illustrative embodiment of an illustrative insulation disturbance detector 72 operates to detect an insulation disturbance. The efficiency of the water heater 20 is dependent upon its thermal conductivity from the tank to ambient temperature. This thermal conductivity is limited by thermal insulation of the storage tank 40. Insulation by itself is not likely to fail on its own, but external factors could damage insulation such as the presence of water, exposure to airflow, or disturbance by people and animals. The occurrence of any of these factors warrants servicing. A user would likely not notice the presence of an insulation failure until the next utility billing cycle, and even then may fail to notice the resulting loss of efficiency if its onset is gradual. The insulation disturbance detector 72 suitably estimates the R-value, which is the inverse of the thermal conductivity (k) estimated by the 1D water heater model 33. For a uniform insulator, the R-value is the ratio of the temperature difference across the insulator and the heat flux (which is the heat transfer per unit area per unit time. This can be written as $R=\Delta T/\dot{Q}$ where $\Delta t$ is the temperature difference across the insulator, $\dot{Q}$ is the heat flux, and R is the R-value. In the 1D model of FIG. 3, the average R-value can be computed for each annular segment 10, 11, 12, 13, 14, 15, 16 of the cylindrical wall of the vertically oriented cylindrical water storage tank 40. Since the R-value is the inverse of thermal conductivity (k), the computation can alternatively be done in terms of k and lumped into the heat transfer coefficient with the environment, U. In one approach, the thermal conductivity is estimated and stored daily (or on some other interval, e.g. weekly, monthly, et cetera). An insulation disturbance is suitably detected as a large change in the day to day (or interval-to-interval) R-value, or as a predefined percent change, from the initial value measured at installation of the water heater 20. The first case (a sudden change in R-factor) is typically due to disruptions in the insulation from external factors, such as a pipe leak above the water heater which moistens the insulation, causing its failure. The second case (more gradual change I R-factor) is indicative of insulation degradation over time, such as due to environmental conditions or manufacturing errors that are causing the insulation to slowly degrade. Depending upon the chosen predefined percent change (or other chosen threshold), the insulation disturbance detector 72 may operate to detect insulation failure in an incipient stage, i.e. before it is severe enough to call for maintenance or replacement.

An illustrative embodiment of an illustrative heating element failure detector 74 operates to detect fouling or build-up on a heating element that can reduce its heat transfer efficiency. The heating element 42, 44 is an electrically resistive device that dissipates power into the water in the tank 40. An ideal heating element would dissipate all of its supplied power into the water instantaneously. However, existing heating elements are not ideal, and there will be some resistance to heat transfer from the heating element to the water. The resistance of the heating element, and therefore its power consumption, depend upon its operating temperature. Using these properties, the effectiveness of the heater can be identified, and changes in its effectiveness noted. A heating element that is becoming fouled is expected to have reduced ability to transfer heat to the water. This is because the media fouling the heating element will likely have lower thermal conductivity compared to the water itself. With reduced thermal conductivity, the rate of temperature rise of the water due to action of the heating element will be diminished, while the temperature of the heating element itself for the same conditions will increase because heat is not being transferred to the water as effectively. Two parameter estimates can be used to detect this failure mode: the effective capacity of the tank; and the effective electrical resistance of the heating element. Note that the effective capacity can be considered as either a purely thermal quantity (e.g. number of Joules that can be stored) or as a volumetric quantity since each unit of water has a certain thermal capacity. The effective capacity of the tank will appear to increase if the heating element is becoming fouled because a slower temperature rise for the same power input will be observed. The rate of temperature rise is dependent upon the power input and the volume of water to be heated, which can be written as $Q=MC\Delta t$ where Q is the energy imparted into the system, M is the volume of water, C is the heat capacity of water, and $\Delta t$ is the temperature rise. The value of M should be constant over all time for a water heater 20, or nearly so. If the heating element is failing due to fouling or buildup, then the same heat Q, which is the electrical power integrated over time, will result in a different $\Delta t$, signifying a change in the other independent variable, M. The temperature rise $\Delta t$ will decrease, implying an increase in M. Analogously to the situation for insulation failure, both short term differences in M and long term differences in M may be monitored to determine if either a dramatic or gradual failure is occurring.

In an alternative embodiment, heating element failure due to fouling or buildup is detected by estimating the electrical resistance of the heating element. In a suitable approach, the resistance of the heating element may be measured using $V=I \cdot R$ where V is the voltage, I is the electrical current (both V and I suitably being represented as root mean squared, or RMS, values), and R is the resistance. The resistance will show a temperature dependency, thus it is possible to detect if the heating element is operating at a much higher or lower temperature then prescribed. Again, the effective resistance would be compared to both short term and long term data to identify if a rapid or gradual failure is occurring.

A second heating element failure mode optionally detected by the heating element failure detector 74 is the development of areas with low electrical conductivity, or cold spots, on the heating element. When a cold spot develops, the effective electrical resistance will increase.

The previous methods can be employed to detect this failure type by determining if there was an increase in the effective resistance.

An illustrative embodiment of an illustrative excessive sediment buildup detector 76 operates to detect excessive sediment build-up 64 that reduces the actual water capacity of the tank 40. Sediment from the water supply may become entrapped within the storage tank 40. Some sediment build up is to be expected, and an anode rod (not shown in FIG. 2) is included in some water heater designs to suppress sediment buildup. However excessive sediment buildup remains a possibility even with anode rod protection, and excessive sediment buildup will result in a decrease in performance. In extreme cases, sediment 64 can occupy a volume inside the tank 40 which is large enough to cause a decrease in performance as experienced by the end user. With excessive sediment buildup, the storage tank 40 does not contain its rated capacity, limiting the volume of heated water available. The presence of this magnitude of sediment typically justifies servicing the water heater 20, as well as examining the water supply for more serious issues which may be the cause of excess sediment buildup. In one approach, the detector 76 suitably detects sediment buildup by calculating the effective capacity of the water tank 40, and comparing it to the capacity calculated at installation. Sediment buildup occurs slowly over time, and a maintenance issue is suitably reported if the measured tank capacity falls below a specified percentage of the starting capacity, which may be variously chosen to choose the level of sediment buildup to be detected (ranging from reporting incipient buildup to major buildup). Multiple thresholds are optionally used, e.g. an "incipient problem" threshold that is triggered for a small reduction in measured tank capacity, and a "serious problem" threshold that is triggered only if the measured tank capacity is more significantly reduced.

It will be observed that there are some similarities between the symptoms of excessive sediment buildup and the symptoms of a failed heating element, and the detectors 74, 76 are preferably configured to distinguish between these two failure modes. In general, both heating element failure and excessive sediment buildup manifest as an apparent change in capacity of the tank 40. However, sediment buildup cause a perceived decrease in tank capacity; whereas, heating element failure causes a perceived increase in tank capacity. Thus, the direction of change in apparent tank capacity output by the model 33 is suitably used by the detectors 74, 76 to distinguish between the heating element failure and sediment buildup failure modes.

An illustrative embodiment of an illustrative drip tube rupture detector 78 operates to detect a rupture 66 in the drip tube 48. As seen in FIG. 2, the drip tube 48 supplies unheated (i.e. cold) water to the bottom of the water storage tank 40, and the heated water rises to the outlet 50 at the top of the tank 40. This flow path design ensures that the drawn water is hot water rather than newly injected cold water. However, if a rupture 66 forms in the drip tube 48, this can produce a cold water bypass flow 68 via which unheated (i.e. cold) supply water can pass directly to the outlet 50 resulting in lower effectiveness and efficiency of the water heater. A drip tube failure may require replacement of the entire tank or water heater, so rapid diagnosis of this problem can avoid unnecessary attempts at remedial maintenance of the water heater. The detector 78 suitably detects the drip tube rupture 66 by monitoring the difference in temperatures at upper and lower positions on the water tank 40, e.g. the difference in temperature readings for the upper and lower heating elements 42, 44 in the illustrative example of FIG. 2.

Under normal operation, cool water enters at the bottom of the tank via the drip tube 48 in response to the drawing of hot water via the outlet 50, and heated water at lower elevation in the tank rises toward the top to replace the drawn hot water. During hot water draw from the tank 40, the temperatures during normal operation will reflect this, with the lower temperature starting to decrease before the upper temperature starts to decrease. By contrast, if the drip tube 48 includes a rupture 66 generating a bypass path 68, then the upper temperature will begin to fall before the lower temperature, and may even fall below the lower temperature, because the cool water is being fed in close to the top of the tank. Such measurements are suitably performed on every usage cycle (triggered by detection of a rapid temperature decrease due to the cold water injection). While this temperature effect can be observed with limited resolution directly from the calculated temperatures of the two heating elements, it is more accurately observed using the water heater model, i.e. in the absence of a drip tube rupture the temperature of the lower-elevation disks should drop faster than the temperature of the higher-elevation disks; whereas, if a cold water bypass exists due to a drip tube rupture then to the contrary the temperature of the higher-elevation disks should drop faster than the temperature of the lower-elevation disks.

With continuing reference to FIG. 6, the diagnostic outputs of the failure mode detectors 72, 74, 76, 78 are suitably processed by a CBM reporting module 80 that generates a human-perceptible report of any detected failure, or if no failure is detected then a human-perceptible report that no failure has been detected. Because there is a relatively small finite set of failure modes being monitored, in some embodiments the CBM reporting module 80 includes a memory or database storing natural language (e.g. English) text describing each potential failure (or lack thereof) along with the detected symptoms as described above. Such a report may be transmitted to the facility maintenance entity 34, for example as a notification push and/or as a transmitted electronic mail (email) message or so forth. Additionally or alternatively, the CBM reporting module may report any detected failure mode (or lack thereof) at a lower-level format, for example transmitting a failure diagnosis binary string of N bits to the dispatch engine 26 where (by way of illustration) bit zero is set to "0" if there is no insulation disturbance and is set to "1" if there is a detected insulation disturbance, and similarly (using bits one, two, . . . of the binary string) for the remaining failure modes that are monitored by the CBM system. In general, the processing components 33, 72, 74, 76, 78, 80 are suitably implemented as software or firmware executed by the microcontroller or microprocessor of the load controller 30 and/or by the dispatch engine 26.

The CBM system has been described as operating in conjunction with in conjunction with the illustrative demand response system described with reference to FIG. 1, and in conjunction with the illustrative electric water heater(s) 20. However, it will be appreciated that the CBM system can be a standalone system not operating in conjunction with any demand response system, or can be an ancillary system operating in conjunction with some other type of automated water heater control system (e.g., a system coordinating operation of a bank of water heaters supplying hot water to a common outlet). It will be further appreciated that the disclosed CBM system can operate to monitor failure modes of other types of loads. For example, adaptation to CBM monitoring of a natural gas (or other gas-fired) water heater is straightforward, as the resistive heating elements 42, 44 are replaced by a gas line and the power input monitoring (e.g. by a clamp-on ammeter in the case of an electric water heater) is suitably replaced by gas flow monitoring in combination with a suitable conversion factor converting gas flow to power input. The insulation disturbance, excessive sediment, and drip tube rupture failure modes can also occur in a gas-fired water heater, while the failure mode of resistive heating element fouling or cold spot evolution translates to failure modes that compromise operation of the gas burner.

Still further, it is contemplated to employ the disclosed CBM systems and methods in conjunction with loads other than water heaters. By way of illustrative example, CBM of heating, ventilation, and air conditioning (HVAC) systems entails modeling HVAC operation based on inputs including the electrical power input to the HVAC system, room temperature, outside temperature, and air conditioner duty cycle to detect changes in HVAC performance, capacity, and efficiency. A failure mode such as blower resistance due to filter blockage can be detected based on increased blower electrical current draw to force air through the partially blocked filter, thus enabling a condition-based notification or email that the filter should be replaced. A refrigerant leak can be detected by observing normal blower operation and normal HVAC duty cycling in conjunction with less efficient cooling as observed by a less rapid temperature drop when the HVAC is operating, or a higher duty cycle overall to maintain the temperature set point. In a multi-room HVAC system, duct occlusion can be detected as reduced cooling efficiency for one room as compared with other rooms cooled by the HVAC system, from which an occlusion of the duct feeding that one room can be inferred.

It may be noted that the diagnostic accuracy of the CBM system may be less than perfect. This is because the CBM system is providing a diagnostic aid, but typically does not perform the diagnosis upon which maintenance decisions are made (much less the physical maintenance), both of which remain in the domain of human maintenance personnel. Rather, the CBM system provides an indication that a certain failure mode may be present, calling for investigation by human maintenance personnel. Thus, so long as the CBM system provides sufficient diagnostic accuracy (for example, as measured by a false positives rate in which a failure is detected that is ultimately determined to not be present, and/or by a false negatives rate in which a failure that is present is not detected by the CBM system) so that maintenance costs overall are reduced, or overall operational efficiency is increased, then the CBM system provides a useful benefit, such as providing an ancillary benefit to end users incentivizing (at least in part) participation in the demand response aggregation.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A water heater control system for controlling a water heater including a vertically oriented cylindrical water storage tank having a cylindrical wall, and at least one heating element arranged to heat water in the water storage tank, the electric water heater control system comprising:
   a load controller comprising,
   an electronic data processing device configured to operate the water heater including operating the at least one heating element based on temperature readings determined from a resistance of the at least one heating element to control water temperature of water in the water storage tank,
   a low energy pulse circuit operative to send a voltage pulse to the at least one heating element, and
   a voltage and current measurement circuit operative to measure the current drawn by the at least one heating element responsive to the voltage pulse; and
   a water heater modeling component comprising an electronic data processing device configured to model the water heater using a one-dimensional model that includes:
     a vertical stack of disks representing the water volume in the cylindrical water storage tank, and
     a stack of annular segments surrounding the vertical stack of disks wherein the stack of annular segments represents the cylindrical wall of the cylindrical water storage tank.

2. The water heater control system of claim 1, wherein the load controller is configured to calculate the resistance of the at least one heating element in accordance with the measured current draw and the voltage pulse.

3. The water heater control system of claim 2, wherein the load controller is configured to generate the temperature readings in accordance with the calculated resistance.

4. The water heater control system of claim 2, wherein the load controller is configured to identify the at least one heating element operating responsive to the calculated resistance.

5. The water heater control system of claim 3 further comprising:
   a condition-based maintenance system comprising an electronic data processing device configured to detect a failure mode present in the water heater based on an output of the water heating model component.

6. The water heater control system of claim 5, wherein the condition-based maintenance system is configured to detect a failure mode comprising insulation disturbance present in the water heater based on R-values or thermal conductivity values computed for the annular segments representing the cylindrical wall of the cylindrical water storage tank.

7. The water heater control system of claim 5, wherein the condition-based maintenance system is configured to detect a failure mode comprising a heating element failure present in the water heater based on an increase over time of the thermal or volumetric capacity of the water in the water storage tank determined using the water heater modeling component.

8. The water heater control system of claim 5, wherein the water heater is an electric water heater, the at least one heating element is a resistive heating element, and the condition-based maintenance system is configured to detect a failure mode comprising a heating element failure present in the water heater based on an increase in electrical resistance measured for the heating element over time.

9. The water heater control system of claim 5, wherein the condition-based maintenance system is configured to detect a failure mode comprising sediment buildup present in the water storage tank of the water heater based on a decrease over time of the thermal or volumetric capacity of the water in the water storage tank determined using the water heater modeling component.

10. The water heater control system of claim 5, wherein the condition-based maintenance system is configured to detect a failure mode comprising a tube rupture present in the water heater based on more rapid cooling of the upper elevation disks of the vertical stacked disks as compared with the lower elevation disks during a hot water draw event.

11. The water heater control system of claim 5, wherein the load controller is further configured to (i) communicate with an aggregation demand response dispatch engine comprising an electronic data processing device that is configured to send demand response commands to an aggregation of loads including the water heater and (ii) operate the water heater in accord with demand response commands received from the aggregation demand response dispatch engine.

12. The water heater control system of claim 1 wherein the load controller is further configured to (i) communicate with an aggregation demand response dispatch engine comprising an electronic data processing device that is configured to send demand response commands to an aggregation of loads including the water heater and (ii) operate the water heater in accord with demand response commands received from the aggregation demand response dispatch engine,
wherein a demand response operation performed by the cooperating load controller and aggregation demand response dispatch engine is based at least in part on energy stored in the vertically oriented cylindrical water storage tank as determined using the water heater modeling component.

13. The water heater control system of claim 1 wherein the one-dimensional model comprises coupled differential equations including:
for each disk of the vertical stack of disks representing the water volume in the cylindrical water storage tank, a differential equation expressing the time derivative of the temperature of the disk estimated by the one-dimensional model; and
for each annular segment of the stack of annular segments representing the cylindrical wall of the cylindrical water storage tank, a differential equation expressing the time derivative of the temperature of the annular segment estimated by the one-dimensional model.

14. A system comprising:
a water heater including a water storage tank, and at least one heating element arranged to heat water in the water storage tank;
a load controller comprising:
an electronic data processing device,
a low energy pulse circuit operative to send a voltage pulse to the at least one heating element, and
a voltage and current measurement circuit operative to measure the current drawn by the at least one heating element responsive to the voltage pulse,
wherein the electronic data processing device is configured to operate the water heater including operating the at least one heating element based on temperature readings determined from a resistance of the at least one heating element to control water temperature of water in the water storage tank;
an aggregation demand response dispatch engine comprising an electronic data processing device configured to send demand response commands to load controllers of an aggregation of loads including the load controller configured to operate the water heater wherein the load controller is further configured to operate the water heater in accord with demand response commands received from the aggregation demand response dispatch engine; and
a condition-based maintenance system comprising an electronic data processing device configured to detect a failure mode present in the water heater based on information including the temperature readings determined from the resistance of the at least one heating element and power input to the water heater.

15. The system of claim 14,
wherein the load controller is configured to calculate the resistance of the at least one heating element in accordance with the measured current draw and the voltage pulse, and to generate the temperature readings in accordance with the calculated resistance.

16. The system of claim 15 further comprising:
a water heater modeling component comprising an electronic data processing device configured to model the water heater using a one-dimensional model of the water heater that receives as inputs the temperature readings determined from a resistance of the at least one heating element and power input to the water heater, wherein the condition-based maintenance system is configured to detect a failure mode present in the water heater based on parameter values estimated by the water heater modeling component.

17. The system of claim 16, wherein the one-dimensional model includes:
a vertical stack of disks representing water inside the water storage tank, and
a vertical stack of annular segments that surrounds the vertical stack of disks and that represents the wall of the water storage tank.

18. The system of claim 17, wherein the condition-based maintenance system is configured to detect a failure mode comprising insulation disturbance present in the water heater based on R-values or thermal conductivity values computed for the annular segments representing the wall of the water storage tank.

19. The system of claim 16, wherein the condition-based maintenance system is configured to detect a failure mode comprising a heating element failure present in the water heater based on an increase over time of the thermal or volumetric capacity of the water in the water storage tank determined using the water heater modeling component.

20. The system of claim 16, wherein the condition-based maintenance system is configured to detect a failure mode comprising sediment buildup present in the water storage tank of the water heater based on a decrease over time of the thermal or volumetric capacity of the water in the water storage tank determined using the water heater modeling component.

21. The system of claim 14, wherein the water heater is an electric water heater, the at least one heating element is a resistive heating element, and the condition-based maintenance system is configured to detect a failure mode comprising a heating element failure present in the water heater based on an increase in electrical resistance measured for the heating element over time.

22. The system of claim 14, wherein the water heater includes an upper heating element and a lower heating element each having distinct resistances thereof, wherein the load controller is configured to calculate each distinct resistance to determine temperature in an upper portion of the water storage tank and temperature in a lower portion of the water storage tank, and the condition-based maintenance system is configured to detect a failure mode comprising a tube rupture present in the water heater based on more rapid decrease in temperature associated with the upper heating element as compared with temperature associated with the lower heating element during a hot water draw event.

23. A system comprising:
an electrical load;

a load controller comprising an electronic data processing device configured to operate the electrical load, a low energy pulse circuit operative to send a voltage pulse to the at least one heating element, and a voltage and current measurement circuit operative to measure the current drawn by the at least one heating element responsive to the voltage pulse, wherein the load controller is configured to calculate the resistance of the at least one heating element in accordance with the measured current draw and the voltage pulse, and to generate the temperature readings in accordance with the calculated resistance;

an aggregation demand response dispatch engine comprising an electronic data processing device configured to send demand response commands to a loads aggregation including sending demand response commands to the load controller configured to operate the electrical load, wherein the load controller is further configured to operate the electrical load in accord with demand response commands received from the aggregation demand response dispatch engine; and a condition-based maintenance system comprising an electronic data processing device configured to detect a failure mode present in the electrical load based on information also input to the load controller.

24. The system of claim 23, wherein the condition-based maintenance system is configured to detect a failure mode present in the electrical load based on information also input to the load controller including (i) temperature determinations from the calculated resistance of the at least one heating element that corresponds to a temperature of a fluid volume whose temperature is controlled by the load controller operating the electrical load and (ii) electrical power input to the electrical load.

25. The system of claim 24, wherein the electrical load is one of an electric water heater and a heating, ventilation, and air conditioning (HVAC) system.

* * * * *